US007015300B2

(12) United States Patent
Rajagopalan et al.

(10) Patent No.: US 7,015,300 B2
(45) Date of Patent: Mar. 21, 2006

(54) MULTILAYERED GOLF BALL AND COMPOSITION

(75) Inventors: Murali Rajagopalan, South Dartmouth, MA (US); Shenshen Wu, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 155 days.

(21) Appl. No.: 10/615,936

(22) Filed: Jul. 10, 2003

(65) Prior Publication Data

US 2004/0010096 A1    Jan. 15, 2004

Related U.S. Application Data

(63) Continuation-in-part of application No. 10/051,121, filed on Jan. 22, 2002, now Pat. No. 6,673,859, which is a continuation-in-part of application No. 09/756,761, filed on Jan. 10, 2001, now Pat. No. 6,645,091, which is a continuation of application No. 09/404,146, filed on Sep. 27, 1999, now Pat. No. 6,355,715, which is a continuation-in-part of application No. 09/311,591, filed on May 14, 1999, now Pat. No. 6,210,294, which is a continuation-in-part of application No. 08/996,718, filed on Dec. 23, 1997, now Pat. No. 6,124,389, which is a continuation-in-part of application No. 08/603,057, filed on Feb. 16, 1996, now Pat. No. 5,759,676, which is a continuation-in-part of application No. 08/482,522, filed on Jun. 7, 1995, now Pat. No. 5,688,191.

(51) Int. Cl.
*A63B 37/12* (2006.01)
*A63B 37/00* (2006.01)

(52) U.S. Cl. .................. 528/76; 528/77; 528/80; 528/81; 528/85; 473/374; 473/377; 473/378

(58) Field of Classification Search .............. 528/76, 528/77, 80, 81, 85; 473/374, 377, 378
See application file for complete search history.

(56) References Cited

U.S. PATENT DOCUMENTS

| | | | |
|---|---|---|---|
| 696,353 A | 3/1902 | Richards | |
| 696,366 A | 3/1902 | Kempshall | |
| 3,147,324 A | 9/1964 | Ward | |
| 3,262,272 A | 7/1966 | Barakauskas et al. | |
| 3,310,102 A | 3/1967 | Trombe | 165/133 |
| 3,359,293 A | 12/1967 | Kent | 524/493 |
| 3,490,146 A | 1/1970 | Guichet | 433/69 |
| 3,808,077 A | 4/1974 | Rieser | 156/102 |
| 3,989,568 A | 11/1976 | Isaac | 156/182 |
| 4,062,825 A | 12/1977 | Watabe et al. | 260/37 N |
| 4,090,716 A | 5/1978 | Martin et al. | 473/384 X |
| 4,123,061 A | 10/1978 | Dusbiber | 273/220 |
| 4,141,559 A | 2/1979 | Melvin et al. | 473/372 |
| 4,234,184 A | 11/1980 | Deleens et al. | 473/378 |
| 4,248,432 A * | 2/1981 | Hewitt et al. | 473/354 |
| 4,337,947 A | 7/1982 | Saito et al. | 473/356 |
| 4,349,657 A * | 9/1982 | Holloway | 528/66 |
| 4,389,365 A | 6/1983 | Kudriavetz | 264/297.8 |
| 4,398,000 A | 8/1983 | Kataoka et al. | 525/437 |
| 4,431,193 A | 2/1984 | Nesbitt | 273/235 R |
| 4,499,239 A | 2/1985 | Murakami et al. | 525/111 |
| 4,560,168 A | 12/1985 | Aoyama | 273/232 |
| 4,625,964 A | 12/1986 | Yamada | 273/62 |
| 4,650,193 A | 3/1987 | Molitor et al. | 273/228 |
| 4,674,751 A | 6/1987 | Molitor et al. | 473/385 |
| 4,714,253 A | 12/1987 | Nakahara et al. | 273/228 |
| 4,781,383 A | 11/1988 | Kamada et al. | 273/228 |
| 4,848,770 A | 7/1989 | Shama | 243/228 |
| 4,858,924 A | 8/1989 | Saito et al. | 273/62 |
| 4,863,167 A | 9/1989 | Matsuki et al. | 273/62 |
| 4,884,814 A | 12/1989 | Sullivan | 514/524 |
| 4,914,152 A | 4/1990 | Miyashita et al. | 525/68 |
| 4,919,434 A | 4/1990 | Saito | 273/235 |
| 4,925,193 A | 5/1990 | Melvin et al. | 273/232 |
| 4,956,438 A | 9/1990 | Ruetman et al. | 525/60 |
| 4,960,281 A | 10/1990 | Aoyama | 273/232 |
| 4,968,752 A | 11/1990 | Kawamoto et al. | 525/194 |
| 4,984,804 A | 1/1991 | Yamada et al. | 473/372 |
| 4,986,545 A | 1/1991 | Sullivan | 473/372 |
| 5,000,459 A | 3/1991 | Isaac | 473/356 |
| 5,002,281 A | 3/1991 | Nakahara et al. | 273/220 |
| 5,006,297 A | 4/1991 | Brown et al. | 264/234 |
| 5,026,067 A | 6/1991 | Gentiluomo | 273/220 |
| 5,068,151 A | 11/1991 | Nakamura | 428/407 |
| 5,071,578 A | 12/1991 | Ohkubo et al. | 252/62.54 |
| 5,072,944 A | 12/1991 | Nakahara et al. | 273/220 |
| 5,104,126 A | 4/1992 | Gentiluomo | 273/238 |
| 5,120,791 A | 6/1992 | Sullivan | 525/196 |
| 5,150,906 A | 9/1992 | Molitor et al. | 273/220 |
| 5,159,035 A | 10/1992 | Evani | 526/196 |

(Continued)

FOREIGN PATENT DOCUMENTS

EP    0 637 459 A1    2/1995

(Continued)

OTHER PUBLICATIONS

Oertel, Polyurethane Handbook $2^{nd}$ Edition; 1993 , p. 21-22.*

(Continued)

Primary Examiner—David J. Buttner
(74) Attorney, Agent, or Firm—Swidler Berlin LLP

(57) ABSTRACT

A multilayer golf ball formed of a core, a cover layer and an optional intermediate layer disposed between the core and cover, wherein at least one layer includes a composition including a diisocyanate, a polyol or amine-terminated compound, and a curing agent, wherein the curing agent includes a diol or secondary diamine.

20 Claims, 3 Drawing Sheets

U.S. PATENT DOCUMENTS

| | | | |
|---|---|---|---|
| 5,184,828 A | 2/1993 | Kim et al. | 273/228 |
| 5,222,739 A | 6/1993 | Horiuchi et al. | 473/356 |
| 5,248,878 A | 9/1993 | Ihara | 219/121.69 |
| 5,249,804 A | 10/1993 | Sanchez | 273/232 |
| 5,253,871 A | 10/1993 | Viollaz | 273/228 |
| 5,298,571 A | 3/1994 | Statz et al. | 525/330 |
| 5,314,187 A | 5/1994 | Proudfit | 273/235 R |
| 5,316,298 A | 5/1994 | Hutin et al. | 273/78 |
| 5,334,673 A | 8/1994 | Wu | 273/235 |
| 5,368,304 A | 11/1994 | Sullivan et al. | 273/220 |
| 5,387,637 A | 2/1995 | Sullivan | 524/493 |
| 5,403,453 A | 4/1995 | Roth et al. | 204/164 |
| 5,415,937 A | 5/1995 | Cadorniga et al. | 428/407 |
| 5,439,227 A | 8/1995 | Egashira et al. | 273/228 |
| 5,456,972 A | 10/1995 | Roth et al. | 428/224 |
| 5,461,109 A | 10/1995 | Blair et al. | 524/839 |
| 5,467,994 A | 11/1995 | Moriyama et al. | 273/222 |
| 5,484,870 A | 1/1996 | Wu | 528/28 |
| 5,492,972 A | 2/1996 | Stefani | 525/196 |
| 5,496,496 A | 3/1996 | Kajita et al. | 252/182.24 |
| 5,543,467 A | 8/1996 | Hamada et al. | 525/207 |
| 5,553,852 A | 9/1996 | Higuchi et al. | 473/373 |
| 5,556,098 A | 9/1996 | Higuchi et al. | 473/373 |
| 5,562,552 A | 10/1996 | Thurman | 473/379 |
| 5,565,524 A | 10/1996 | Hamada et al. | 525/208 |
| 5,575,472 A | 11/1996 | Magerman et al. | 29/530 |
| 5,575,477 A | 11/1996 | Hwang | 473/379 |
| 5,580,057 A | 12/1996 | Sullivan et al. | 273/DIG. 22 |
| 5,601,502 A | 2/1997 | Hiraoka et al. | 473/373 |
| 5,609,532 A | 3/1997 | Chikaraishi | 473/365 |
| 5,625,003 A | 4/1997 | Kato et al. | 525/208 |
| 5,661,207 A | 8/1997 | Carlson et al. | 524/414 |
| 5,681,898 A | 10/1997 | Pocklington | 525/193 |
| 5,688,191 A | 11/1997 | Cavallaro et al. | 473/373 |
| 5,692,974 A | 12/1997 | Wu et al. | 473/377 |
| 5,713,801 A | 2/1998 | Aoyama | 473/354 |
| 5,733,428 A | 3/1998 | Calabria et al. | 264/134 |
| 5,744,549 A | 4/1998 | Lutz | 525/129 |
| 5,759,676 A | 6/1998 | Cavallaro et al. | 428/215 |
| 5,803,831 A | 9/1998 | Sullivan et al. | |
| 5,810,678 A | 9/1998 | Cavallaro et al. | 473/373 |
| 5,813,923 A | 9/1998 | Cavallaro et al. | 473/373 |
| 5,816,937 A | 10/1998 | Shimosaka et al. | 473/354 |
| 5,820,488 A | 10/1998 | Sullivan et al. | 473/374 |
| 5,827,134 A | 10/1998 | Sullivan et al. | 473/372 |
| 5,833,553 A | 11/1998 | Sullivan et al. | |
| 5,849,168 A | 12/1998 | Lutz | 264/755 |
| 5,856,388 A | 1/1999 | Harris et al. | 524/320 |
| 5,859,153 A | 1/1999 | Kirk et al. | 525/481 |
| 5,885,172 A | 3/1999 | Hebert et al. | 473/354 |
| 5,885,173 A | 3/1999 | Keller | 473/385 |
| 5,888,437 A | 3/1999 | Calabria et al. | 264/135 |
| 5,902,855 A | 5/1999 | Sullivan | 525/221 |
| 5,908,358 A | 6/1999 | Wu | 473/378 |
| 5,919,100 A | 7/1999 | Boehm et al. | 473/354 |
| 5,929,189 A | 7/1999 | Ichikawa et al. | 528/76 |
| 5,947,842 A | 9/1999 | Cavallaro et al. | 473/373 |
| 5,957,787 A | 9/1999 | Hwang | 473/379 |
| 5,959,059 A | 9/1999 | Vedula et al. | 528/76 |
| 5,965,669 A | 10/1999 | Cavallaro et al. | 525/221 |
| 5,971,870 A | 10/1999 | Sullivan et al. | 473/351 |
| 5,976,035 A | 11/1999 | Umezawa et al. | 473/364 |
| 5,981,654 A | 11/1999 | Rajagopalan | 525/66 |
| 5,981,658 A | 11/1999 | Rajagopalan et al. | 525/72 |
| 6,056,842 A | 5/2000 | Dalton et al. | 156/243 |
| 6,075,223 A | 6/2000 | Harrison | 219/121.85 |
| 6,103,822 A | 8/2000 | Housel et al. | 524/840 |
| 6,117,024 A | 9/2000 | Dewanjee | 473/351 |
| 6,124,389 A | 9/2000 | Cavallaro et al. | 525/432 |
| 6,129,640 A | 10/2000 | Higuchi et al. | 473/374 |
| 6,129,881 A | 10/2000 | Puniello | 264/278 |
| 6,132,324 A | 10/2000 | Hebert et al. | 473/378 |
| 6,149,535 A | 11/2000 | Bissonnette et al. | 473/354 |
| 6,180,040 B1 | 1/2001 | Ladd et al. | 264/248 |
| 6,180,722 B1 | 1/2001 | Dalton et al. | 525/193 |
| 6,207,784 B1 | 3/2001 | Rajagopalan | 528/71 |
| 6,213,898 B1 | 4/2001 | Ogg | 473/383 |
| 6,235,230 B1 | 5/2001 | Puniello | 264/278 |
| 6,241,622 B1 | 6/2001 | Gobush et al. | 473/199 |
| 6,267,694 B1 | 7/2001 | Higuchi et al. | 473/374 |
| 6,277,034 B1 | 8/2001 | Nesbitt et al. | 473/372 |
| 6,286,364 B1 | 9/2001 | Aoyama et al. | 73/65.03 |
| 6,290,611 B1 | 9/2001 | Rajagopalan et al. | 473/371 |
| 6,290,615 B1 | 9/2001 | Ogg | 473/378 |
| 6,315,680 B1 | 11/2001 | Dalton et al. | 473/373 |
| 6,315,915 B1 | 11/2001 | Hebert et al. | 216/67 |
| 6,338,684 B1 | 1/2002 | Winfield et al. | 473/378 |
| 6,351,161 B1 | 2/2002 | Schneider et al. | 327/108 |
| 6,355,715 B1 | 3/2002 | Ladd et al. | 524/432 |
| 6,379,138 B1 | 4/2002 | Puniello et al. | 425/116 |
| 6,383,092 B1 | 5/2002 | Ogg | 473/378 |
| 6,409,615 B1 | 6/2002 | McGuire et al. | 473/383 |
| 6,462,303 B1 | 10/2002 | Brown | 219/121.69 |
| 6,486,261 B1 | 11/2002 | Wu et al. | 525/332.6 |
| 6,488,591 B1 | 12/2002 | Gobush et al. | 473/199 |
| 6,500,073 B1 | 12/2002 | Gobush et al. | 473/199 |
| 6,511,388 B1 | 1/2003 | Dewanjee | 473/377 |
| 6,645,091 B1 * | 11/2003 | Wu et al. | 473/377 |
| 6,673,859 B1 * | 1/2004 | Ladd et al. | 524/432 |
| 2001/0009310 A1 | 7/2001 | Hebert et al. | |
| 2002/0025862 A1 | 2/2002 | Sullivan et al. | |
| 2002/0028885 A1 | 3/2002 | Sullivan et al. | |
| 2002/0079615 A1 | 6/2002 | Puniello et al. | |
| 2002/0082358 A1 | 6/2002 | Ohira et al. | |
| 2002/0160859 A1 | 10/2002 | Morgan et al. | |
| 2002/0160862 A1 | 10/2002 | Morgan et al. | |
| 2002/0193181 A1 * | 12/2002 | Kennedy et al. | 473/373 |
| 2003/0078348 A1 | 4/2003 | Rajagopalan et al. | |
| 2003/0088048 A1 | 5/2003 | Wu | |
| 2003/0096936 A1 | 5/2003 | Wu et al. | |
| 2003/0106442 A1 | 6/2003 | Gosetti | |
| 2003/0114255 A1 | 6/2003 | Dalton et al. | |
| 2003/0119989 A1 | 6/2003 | Ladd et al. | |
| 2003/0125134 A1 | 7/2003 | Nardacci | |
| 2003/0153716 A1 | 8/2003 | Wu et al. | |
| 2003/0158001 A1 | 8/2003 | Morgan et al. | |
| 2003/0212240 A1 | 11/2003 | Wu et al. | |
| 2003/0220464 A1 | 11/2003 | Wu et al. | |
| 2003/0232666 A1 | 12/2003 | Sullivan | |

FOREIGN PATENT DOCUMENTS

| | | |
|---|---|---|
| GB | 2 260 546 | 4/1993 |
| GB | 2 267 908 | 12/1993 |
| GB | 2 278 609 | 12/1994 |
| GB | 2 335 368 A | 9/1999 |
| JP | 142228 | 5/1994 |
| WO | WO 98/37929 | 9/1998 |

OTHER PUBLICATIONS

Raj. B. Durairaj et al., "Cast Polyurethanes From Resorcinol-Based Aromatic Diols" (Oct. 10-14, 1998).

Raj B. Durairaj, "HER Materials For Polyurethane Applications" (Spring, 1999).

U.S. Appl. No. 10/409,092 filed Apr. 9, 2003 entitled "Water Resistant Polyurea Elastomers for Golf Equipment".

U.S. Appl. No. 09/717,136 filed Nov. 22, 2000 entitled "Method of Making Golf Balls".

U.S. Appl. No. 09/442,845 filed Nov. 18, 1999 entitled "Mold For A Golf Ball".

* cited by examiner

MULTILAYERED GOLF BALL AND COMPOSITION

CROSS-REFERENCE TO RELATED APPLICATIONS

This application is a continuation-in-part of U.S. patent application Ser. No. 09/756,761, filed Jan. 10, 2001, now U.S. Pat. No. 6,645,091, which is a continuation-in-part of U.S. patent application Ser. No. 09/311,591, filed May 14, 1999, now U.S. Pat. No. 6,210,294, and also a continuation-in-part of U.S. patent application Ser. No. 10/051,121, filed Jan. 22, 2002, now U.S. Pat. No. 6,673,859, which is a continuation of U.S. patent application Ser. No. 09/404,146, filed Sep. 27, 1999, now U.S. Pat. No. 6,355,715, which is a continuation-in-part of U.S. patent application Ser. No. 08/996,718, filed Dec. 23, 1997, now U.S. Pat. No. 6,124,389, which is a continuation-in-part of U.S. patent application Ser. No. 08/603,057, filed Feb. 16, 1996, now U.S. Pat. No. 5,759,676, which is a continuation-in-part of U.S. patent application Ser. No. 08/482,522, filed Jun. 7, 1995, now U.S. Pat. No. 5,688,191. The entire disclosures of these applications are incorporated by reference herein.

FIELD OF THE INVENTION

This invention relates generally to golf balls, and more specifically, to a multilayer golf ball formed, at least in part, from a polyurethane or polyurea composition. The polyurethane and polyurea compositions of the invention may include at least one diisocyanate, at least one polyol (polyurethane) or amine-terminated moiety (polyurea), and at least one curing agent. In particular, this invention relates to a golf ball having a core, a cover and an optional intermediate layer disposed between the core and cover, wherein at least one layer is formed from a polyurethane or polyurea composition including para-phenylene diisocyanate monomer. The multilayer golf balls of the present invention have been found to provide good distance, durability, and desirable playing characteristics.

BACKGROUND OF THE INVENTION

Conventional golf balls can be divided into two general types or groups: solid balls or wound balls. The difference in play characteristics resulting from these different types of constructions can be quite significant.

Balls having a solid construction are generally most popular with the average recreational golfer because they provide a very durable ball while also providing maximum distance. Solid balls are made with a solid core, usually formed of a crosslinked rubber, which is encased by a cover material. Typically the solid core is formed of polybutadiene which is chemically crosslinked with zinc diacrylate and/or similar crosslinking agents and is covered by a tough, cut-proof blended cover. The cover is generally formed of a material such as SURLYN, which is a trademark for an ionomer resin produced by DuPont of Wilmington, Del. This combination of core and cover materials provides a ball that is virtually indestructible by golfers. Further, such a combination imparts a high initial velocity to the ball that results in improved distance. Because the materials of which the ball is formed are very rigid, solid balls generally have a hard "feel" when struck with a club. Likewise, due to their hardness, these balls have a relatively low spin rate, which provides greater distance.

At the present time, the wound ball remains the preferred ball of more advanced players due to its spin and feel characteristics. Wound balls typically have either a solid rubber or liquid center core around which many yards of a stretched elastic thread or yarn are wound. The wound core is then covered with a durable cover material such as a SURLYN or similar material or a softer cover such as balata or polyurethane. Wound balls are generally softer and provide more spin than non-wound balls, which enables a skilled golfer to have more control over the ball's flight and final position. Particularly, with approach shots into the green, the high spin rate of soft, wound balls enables the golfer to stop the ball very near its landing position.

A number of patents have been issued that are directed to modifying the properties of a conventional solid ball through alteration of the typical single core, single cover construction. This alteration results in a multilayer ball having a dual cover layer, dual core layer, and/or a ball having a mantle layer disposed between the cover and the core. The inventions disclosed in the prior art patents are directed towards improving a variety of golf balls physical properties that help determine "in-play" characteristics.

Several patents are directed towards improving the carry distance of such balls. For example, U.S. Pat. No. 4,863,167 relates to a three piece solid golf ball having increased flight distance, wherein the ball has a center portion and an outer layer formed from a rubber composition, wherein the outer layer is harder than the center portion and further contains a gravity-adjusting filler so as to impart a higher specific gravity to the outer layer than that of the center portion. U.S. Pat. No. 5,184,828 relates to a solid three-piece golf ball having improved rebound characteristics and carry distance while maintaining an adequate spin rate, wherein these characteristics are allegedly obtained by controlling the size of the polybutadiene inner core and outer layer as well as their specific gravity and hardness. According to the '828 patent, the key to obtaining the desired rebound characteristics is that the maximum hardness (42–62 Shore D) must be located at the interface between the core and the mantle and the hardness must then decrease both inwardly and outwardly. U.S. Pat. No. 4,714,253 is also directed towards a three-piece golf ball having an improved rebound coefficient. This golf ball has a core with a Shore C hardness of 57–80 in its center, but not more than 83 at a distance between 5–10 mm from its center and an outer layer with a Shore C hardness of 70–83.

Additionally, there are a number of patents directed towards improving the spin and feel of solid balls while maintaining the distance provided by the solid construction. For example, U.S. Pat. No. 5,072,944 discloses a three-piece solid golf ball having a center layer and an outer layer prepared from a rubber composition, wherein it is desirable that the center core layer is softer than the outer layer, the layers having a hardness (Shore C) of 25–50 and 70–90, respectively.

U.S. Pat. No. 4,625,964 relates to a solid golf ball having a polybutadiene rubber core of a diameter not more than 32 mm, a polybutadiene rubber intermediate layer having a specific gravity of lower than that of the core material, and a cover. U.S. Pat. No. 4,650,193 is directed towards a solid golf ball having a core comprising a central portion and an integral outer layer, wherein the core is a curable elastomer such as polybutadiene which is treated with a cure altering agent to soften an outer layer of the core, to produce a central layer with a hardness (Shore C) of greater than 75 and an outer layer with a hardness (Shore A) of less than 80.

U.S. Pat. No. 4,848,770 discloses a solid three-piece golf ball which includes a core of a highly filled synthetic rubber or polymeric material, an intermediate mantle of an unfilled synthetic rubber and a cover. The core and intermediate mantle have a hardness of between 50–95 Shore D. U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

The prior art discloses a variety of materials other than polybutadiene for use as intermediate layers. For example, U.S. Pat. No. 5,253,871 concerns a golf ball having a three-piece structure comprising an elastomer core, an intermediate layer of a thermoplastic material containing at least 10% of etheramide block copolymer, preferably blended with an ionomer, and a thermoplastic cover. U.S. Pat. No. 5,681,898 is directed to a multilayer golf ball having a conventional polybutadiene core, an ionomer cover and an intermediate layer formed from a blend of an ethylene methacrylic acid copolymer and a vulcanizate formed from polybutadiene and a peroxide curing agent.

U.S. Pat. Nos. 5,439,227 and 5,556,098 both disclose multilayer golf balls which have a conventional polybutadiene core, conventional covers and an intermediate layer formed from a polyetherester block copolymer blended with an ionomer.

Further, there are also several patents that are directed to golf balls having multiple cover layers. For example, U.S. Pat. No. 4,431,193 relates to a golf ball having a multilayer cover wherein the inner layer is a hard, high flexural modulus ionomer resin and the outer layer is a soft, low flexural modulus ionomer resin, and wherein either (or both) layers may comprise a foamed ionomer resin. U.S. Pat. No. 5,314,187 also relates to golf balls having a multiple layer cover, wherein the outer layer is molded over the inner layer and comprises a blend of balata and an elastomer and the inner layer is an ionomer resin. U.S. Pat. No. 4,919,434 is directed towards a golf ball having a cover which comprises an inner layer and an outer layer, each of which comprise a thermoplastic resin. Preferably the layers include materials that are capable of bonding with each other, for example, by heat, or by other means which are readily known to one of ordinary skill in the art.

U.S. Pat. No. 5,813,923 discloses a golf ball having a core and a cover with an intermediate layer having a flexural modulus of less than 10,000 psi. The core has a compression of less than 70 and the cover has a flexural modulus of greater than 75,000 psi.

However, none of the patents discussed above disclose the multilayer ball of the current invention that employs the materials, and has the improved golf ball properties, as disclosed herein.

It has now been discovered that the use of a polyurethane or polyurea composition, according to the present invention, in forming golf ball cores, intermediate layers, and/or covers, can raise the velocity of a golf ball prepared with the composition closer to the velocities observed with SURLYN®-covered golf balls. Additionally, the curatives used in the compositions of the present invention are less expensive than many curatives typically used by those of ordinary skill in the art, such as VERSALINK® P-250, an oligomeric diamine manufactured by Air Products and Chemicals, Inc. Moreover, the compositions of the present invention are less environmentally hazardous than other cost-effective options, such as ETHACURE® 300 and ETHACURE® 100.

SUMMARY OF THE INVENTION

The present invention is directed to a golf ball including: a core; a layer disposed about the core having a hardness of about 30 Shore D or greater, a flexural modulus of about 1,000 psi to about 80,000 psi, and a thickness of about 0.01 inches to about 0.100 inches, wherein the layer is formed from a thermoplastic composition including p-phenylene diisocyanate; and a cover having a hardness of about 20 Shore D or greater, a flexural modulus of about 1,000 psi to about 30,000 psi, and a thickness of about 0.01 inches to about 0.05 inches, wherein the cover is formed from a thermoset material. In one embodiment, the core includes a center and an outer core layer, wherein the center has a diameter of about 0.5 inches to about 1.3 inches.

In another embodiment, the thermoplastic composition includes a reaction product of p-phenylene diisocyanate and at least one hydroxy-terminated curing agent. The at least one hydroxy-terminated curing agent may be selected from the group consisting of polyethylene propylene glycol, polytetramethylene ether glycol, polyoxypropylene glycol, ethylene oxide capped poly(oxypropylene)glycol, and mixtures thereof. In the alternative, the at least one hydroxy-terminated curing agent may be selected from the group consisting of 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, polytetramethylene ether glycol initiated polycaprolactone, and mixtures thereof.

In yet another embodiment, the at least one hydroxy-terminated curing agent is selected from the group consisting of poly(phthalate carbonate)glycol, poly(hexamethylene carbonate)glycol polycarbonate polyols containing bisphenol A, and mixtures thereof.

The present invention is also directed to a golf ball including a core and at least one cover layer formed from thermoplastic composition having a rebound resilience of about 40 or greater including p-phenylene diisocyanate monomer, wherein the golf ball has a COR of greater than about 0.76.

In this aspect of the invention, the golf ball may further include an intermediate layer. In one embodiment, the intermediate layer includes at least one of an ionomer resin, polyurethane, polyurea, polyamide, highly neutralized polymer, metallocene catalyzed polymer, or mixtures thereof.

In another embodiment, the at least one cover layer is an inner cover layer. The golf ball may further include an outer cover layer disposed about the inner cover layer, wherein the outer cover layer includes at least one thermoset material or at least one thermoplastic material. And, the inner cover layer may include at least two layers.

The thermoplastic composition may include urethane linkages, urea linkages, or combinations thereof and preferably has a hardness of about 40 Shore D, more preferably about 45 Shore D to about 70 Shore D.

In one embodiment, the thermoplastic composition includes a reaction product of p-phenylene diisocyanate and at least one hydroxy-terminated curing agent. For example, the hydroxy-terminated curing agent may be selected from the group consisting of:

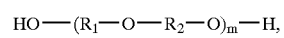

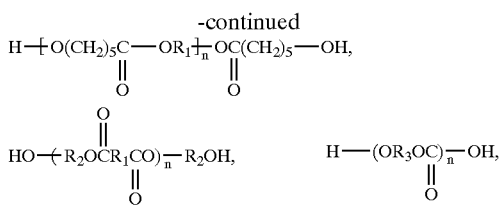

-continued and mixtures thereof, wherein $R_1$ and $R_2$ include linear or branched hydrocarbon chains having about 1 to about 20 carbon atoms, wherein $R_3$ includes at least one phthlatate group, at least one hexamethylene group, at least one bisphenol A group, or combinations thereof, wherein m ranges from about 1 to about 45, and wherein n ranges from about 1 to about 25.

In another embodiment, the thermoplastic composition includes a reaction product of p-phenylene diisocyanate monomer and at least one amine-terminated curing agent. The at least one amine-terminated curing agent may consist essentially of secondary amine-terminated compounds.

In one embodiment, the thermoplastic composition further includes at least one curing agent selected from the group consisting of:

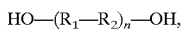

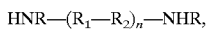

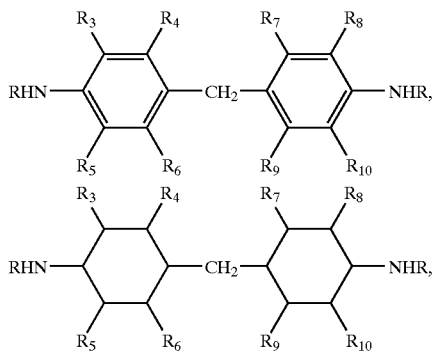

and mixtures thereof, wherein R comprises alkyl groups, wherein $R_1$ and $R_2$ individually comprise linear or branched hydrocarbon chains having about 1 to about 20 carbon atoms, wherein $R_3$, $R_4$, $R_5$, $R_6$, $R_7$, $R_8$, $R_9$, and $R_{10}$ comprise a hydrogen atom, a methyl group, an ethyl group, a propyl group, a butyl group, or mixtures thereof, and wherein n ranges from about 1 to about 20.

The present invention also relates to a golf ball including: a core; a layer disposed about the core having a hardness of about 30 Shore D or greater, a flexural modulus of about 1,000 psi to about 80,000 psi, and a thickness of about 0.01 inches to about 0.100 inches, wherein the intermediate layer is formed from a thermoset material; and a cover having a hardness of about 20 Shore D or greater, a flexural modulus of about 1,000 psi to about 30,000 psi, and a thickness of about 0.01 inches to about 0.05 inches, wherein the cover is formed from a thermoplastic composition including p-phenylene diisocyanate.

In one embodiment, the core includes a center and an outer core layer, wherein the center has a diameter of about 0.5 inches to about 1.3 inches. In another embodiment, the thermoplastic composition further includes at least one density-adjusting filler.

The present invention is also directed to a golf ball including a center, a cover, and optionally, at least one intermediate layer disposed between the center and the cover, wherein at least one of the cover and the at least one intermediate layer is formed with a thermoplastic polyurethane composition including a reaction product of a prepolymer (at least one polyol and at least one diisocyanate) and a curing agent consisting essentially of at least one diol having the formula: $HOH_2CH_2C(OH_2CH_2C)_nO\text{—}X\text{—}O(CH_2CH_2O)_mCH_2CH_2OH$; wherein n and m, each separately have a value of 0, 1, 2, or 3, X is o-phenylene, m-phenylene, p-phenylene, 1,2-cyclohexyl, 1,3-cyclohexyl, or 1,4-cyclohexyl, and mixtures thereof. In one embodiment, n and m each separately have a value of 1 or 2.

In another embodiment, the polyurethane composition further includes at least one diol curing agent selected from the group consisting of ethylene glycol, diethylene glycol, polyethylene glycol, propylene glycol, 1,4-butanediol; 1,5-pentanediol, 1,4-cyclohexane-dimethanol, 1,6-hexanediol, and polytetramethylene ether glycol having molecular weight less than 2000. In yet another embodiment, the thermoplastic polyurethane composition includes at least two curing agents. Additionally, the molecular weight of the diol curing agent is preferably about 50 or greater.

The diisocyanate may be 2,2'-diphenylmethane diisocyanate, 2,4'-diphenylmethane diisocyanate, 4,4'-diphenylmethane diisocyanate; polymeric 4,4'-diphenylmethane diisocyanate; liquid 4,4'-diphenylmethane diisocyanate; toluene diisocyanate; 3,3'-dimethyl-4,4'-biphenylene diisocyanate; p-phenylene diisocyanate; hexamethylene diisocyanate; p-tetramethylxylene diisocyanate; m-tetramethylxylene diisocyanate; naphthalene diisocyanate; 4,4'-dicyclohexylmethane diisocyanate; isophorone diisocyanate; m-phenylene diisocyanate; low free isocyanate monomers; and mixtures thereof.

The polyol may be polytetramethylene ether glycol; poly(oxyethylene oxypropylene)glycol; ethylene oxide capped poly(oxypropylene)glycol; poly(oxyethylene)glycol; poly(oxypropylene)glycol; polyethylene adipate glycol; polyethylene propylene adipate glycol; and polybutylene adipate glycol; ortho-phthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof. In one embodiment, the polyol is selected from the group consisting of polytetramethylene ether glycol; polyethylene adipate glycol; polybutylene adipate glycol; diethylene glycol initiated polycaprolactone; and mixtures thereof In another embodiment, the molecular weight of the polyol is from about 200 to 4000.

In one embodiment, the polyol is preferably present in an amount of about 70 to 98 percent by weight of the prepolymer, the diisocyanate is present in an amount of about 2 to 30 percent by weight of the prepolymer, and the diol curing agent is present in an amount of about 10 to 110 weight percent of the diisocyanate and the polyol. In another embodiment, the diisocyanate is present in an amount of about 2.5 to 12 percent by weight of the prepolymer.

The thermoplastic polyurethane composition may also include at least one secondary diamine curing agent. The secondary diamine curing agent may be selected from the group consisting of 4,4'-bis-(sec-butylamino)-diphenylmethane; 1,4-bis-(sec-butylamino)-benzene; 1,2-bis-(sec-butylamino)-benzene; derivatives of 4,4'-bis-(sec-butylamino)-diphenylmethane; N,N'-diisopropyl-isophorone diamine; 1,4-bis-(sec-butylamino)-cyclohexane; 1,2-bis-(sec-butylamino)-cyclohexane; 4,4'-bis-(sec-butylamino)-diclohexylmethane; derivatives of 4,4'-bis-(sec-butylamino)-dicyclohexylmethane; and mixtures thereof.

In one embodiment, the thermoplastic polyurethane composition includes a reaction product of 4,4'-diphenylmethane diisocyanate; polytetramethylene ether glycol; and mixtures of 1,3-bis-(2-hydroxyethoxy)benzene and 1,3-[bis-(2-hydroxyethoxy)]-diethoxy benzene. The cover may also include the thermoplastic polyurethane composition.

The present invention is also directed to a golf ball including a center, a cover, and optionally, at least one intermediate layer disposed between the center and the cover, wherein at least one of the cover and the at least one intermediate layer is formed with a thermoplastic polyurethane composition including a reaction product of at least one polyol and at least one diisocyanate, and a curing agent consisting of a secondary diamine. In one embodiment, the thermoplastic polyurethane composition may include at least two curing agents.

In this aspect of the invention, the diisocyanate may be selected from the group consisting of 2,2'-diphenylmethane diisocyanate, 2,4'-diphenylmethane diisocyanate, 4,4'-diphenylmethane diisocyanate; polymeric 4,4'-diphenylmethane diisocyanate; liquid 4,4'-diphenylmethane diisocyanate; toluene diisocyanate; 3,3'-dimethyl-4,4'-biphenylene diisocyanate; p-phenylene diisocyanate; hexamethylene diisocyanate; p-tetramethylxylene diisocyanate; m-tetramethylxylene diisocyanate; naphthalene diisocyanate; 4,4'-dicyclohexylmethane diisocyanate; isophorone diisocyanate; m-phenylene diisocyanate; low free isocyanate monomers; and mixtures thereof.

The polyol may be selected from the group consisting of polytetramethylene ether glycol; poly(oxyethylene oxypropylene)glycol; ethylene oxide capped poly(oxypropylene) glycol; poly(oxyethylene)glycol; poly(oxypropylene)glycol; polyethylene adipate glycol; polyethylene propylene adipate glycol; and polybutylene adipate glycol; orthophthalate-1,6-hexanediol polyester polyol; diethylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; saturated and unsaturated hydrocarbon polyols; hydroxy-terminated liquid isoprene rubber; hydroxy-terminated polybutadiene polyol; copolymers of the above mentioned polyols; and mixtures thereof. In one embodiment, the polyol may be selected from the group consisting of polytetramethylene ether glycol; polyethylene adipate glycol; polybutylene adipate glycol; diethylene glycol initiated polycaprolactone; and mixtures thereof. The molecular weight of the polyol is preferably from about 200 to 4000.

The secondary diamine curing agent may be 4,4'-bis-(sec-butylamino)-diphenylmethane; 1,4-bis-(sec-butylamino)-benzene; 1,2-bis-(sec-butylamino)-benzene; derivatives of 4,4'-bis-(sec-butylamino)-diphenylmethane; 1,4-bis-(sec-butylamino)-cyclohexane; N,N'-diisopropyl-isophorone diamine; 1,2-bis-(sec-butylamino)-cyclohexane; 4,4'-bis-(sec-butylamino)-dicyclohexylmethane; derivatives of 4,4'-bis-(sec-butylamino)-dicyclohexylmethane; and mixtures thereof.

In one embodiment, the polyol is present in an amount of about 70 to 98 percent by weight of the prepolymer, the diisocyanate is present in an amount of about 2 to 30 percent by weight of the prepolymer, and the secondary diamine curing agent is present in an amount of about 10 to 110 weight percent of the prepolymer. In another embodiment, the diisocyanate is present in an amount of about 2.5 to 12 percent by weight of the prepolymer.

In one embodiment, the thermoplastic polyurethane composition includes a reaction product of 4,4'-dicyclohexylmethane diisocyanate, copolymer of polytetramethylene ether glycol and polycaprolactone, and 4,4'-bis-(sec-butylamino)-dicyclohexylmethane. In yet another embodiment, the cover includes the thermoplastic polyurethane composition.

Golf balls of the invention may include at least one intermediate layer formed of the thermoplastic polyurethane composition. The center may be fluid-filled center, a solid center, a gel center, or a hollow center. The thermoplastic polyurethane composition may also include a density-modifying filler.

Another aspect of the present invention is directed to an improved multilayer golf ball that includes a core and a cover of at least one layer, wherein the core has a compression of about 90 or less and the cover is formed from a blend including a polyether-type thermoplastic polyurethane that has a percent rebound resilience of greater than about 45, preferably greater than about 60, and wherein the golf ball has a coefficient of restitution of greater than about 0.76.

In one embodiment, the cover blend further includes a second component, wherein the second component is a thermoplastic material. The second component may be selected from the group consisting of polyetherester block copolymers, polyesterester block copolymers, polyetheramide block copolymers, dynamically vulcanized thermoplastic elastomers, styrene-butadiene elastomers, other thermoplastic polyurethanes, thermoplastic polyesters, polymers formed using a metallocene catalyst, and blends thereof. In one embodiment, the second component is a polyetherester block copolymer.

The blend may also include a density adjusting filler in an amount sufficient to provide the at least one layer with a specific gravity of greater than about 1.2. In one embodiment, the layer has a specific gravity of greater than about 1.25. Preferably, the density adjusting filler includes zinc oxide.

In one embodiment, the golf ball of this aspect of the invention includes a core, a cover and intermediate layer disposed therebetween. The intermediate layer may include a blend of a polyether-type polyurethane having a percent rebound resilience of greater than about 45, preferably greater than about 60 percent and another thermoplastic material. For example, the blend may include about 20 to about 90 percent by weight polyether-type thermoplastic polyurethane, about 5 to 50 percent by weight second thermoplastic component, and about 5 to about 40 percent by weight density adjusting filler. In one embodiment, the blend includes about 30 to 60 percent by weight polyether-type thermoplastic polyurethane having a percent rebound resilience of greater than 60, about 20 to 40 percent by weight second thermoplastic component, and about 15 to 30 percent by weight density adjusting filler.

The intermediate layer may have a hardness of about 25 Shore D to 80 Shore D, preferably about 25 Shore D to 80 Shore D, and a flexural modulus of about 1,000 psi to 8,000 psi. In one embodiment, more than about 50 parts per hundred of the composition forming the intermediate layer is polyether-type thermoplastic polyurethane.

In this aspect of the invention, the golf ball preferably has a compression of no greater than about 90. In one embodiment, the cover includes at least one of a thermoplastic or a thermoset material.

The present invention is also directed to a golf ball having a core including polybutadiene, a cover layer having a Shore D hardness of about 54 to 72, and at least one intermediate layer disposed between the cover and the core, wherein the at least one intermediate layer is formed from a blend including about 40 to 60 weight percent of a polyether-type thermoplastic polyurethane having a percent rebound resilience of greater than 60, about 15 to 30 weight percent of a density increasing or decreasing filler such as zinc oxide or barium sulfate or foaming agents or microspheres, about 20 to about 40 weight percent polyetherester or polyesterester block copolymer; and wherein the golf ball has a coefficient of restitution of greater than about 0.78.

In one embodiment, the intermediate layer is formed from a blend including about 45 to 50 weight percent polyether-type thermoplastic polyurethane, about 18 to 22 weight percent zinc oxide, and about 30 to 35 weight percent polyetherester or polyesterester block copolymer. In another embodiment, the intermediate layer has a Shore D hardness of less than about 40 and a flexural modulus of less than about 10,000 psi.

The present invention is also directed to a golf ball having a coefficient of restitution of greater than about 0.78 and a compression from about 50 to about 90, wherein the ball includes a core and a cover having at least an inner or an outer layer disposed concentrically about the core, wherein the layer is a composition including a polyether-type polyurethane derived from a diisocyanate reacted with a hydroxyl terminated polyether and a glycol chain extender composition. The hydroxyl-terminated polyether preferably has alkylene oxide repeat units containing from 2 to 6 carbon atoms and a weight average molecular weight of at least 1,400.

The polyether-type polyurethane may be blended with a thermoplastic selected from the group of homo- and copoly-esters, homo- and co-polyamides, polyetherester block copolymers, polyesterester block copolymers, polyetheramide block copolymers, polyesteramide block copolymers, and other polyurethanes. When used as an inner cover layer, the resultant material preferably has a flexural modulus less than 20,000 psi.

The present invention is also directed to a golf ball that has a thermoset polybutadiene-rubber based core and a cover having an inner layer and an outer layer. In this aspect of the invention, the inner cover layer preferably includes injection moldable polyurethane having a percent rebound resilience of greater than 65 and a flexural modulus of less than 10,000 psi. The resultant ball has a soft feel, which is due to the low flexural modulus, and a good initial velocity, which is due to the high coefficient of restitution.

In addition, this type of ball is easy to manufacture because the inner layer is injection moldable. In one embodiment, the inner layer is injection molded at a temperature of less than 400° F. In another embodiment, the ball is manufactured by compression molding the core, injection molding the inner layer at a temperature of less than about 400° F., and compression or injection molding the outer cover layer from a thermoplastic material.

In one embodiment, the inner cover layer has a first hardness and the outer layer has a second hardness greater than the first hardness. When the cover hardness is greater than the inner cover layer and has a flexural modulus of greater than about 60,000 psi, the ball will exhibit low spin off of the driver for excellent distance. In another embodiment, the core has a third hardness within about 10 Shore D of the inner cover layer hardness and less than the outer cover layer hardness. The softer core and inner cover layer contribute to the resultant soft feel and low driver spin. In yet another embodiment, the inner cover layer has a specific gravity greater than about 1.2 for an increased moment of inertia.

DETAILED DESCRIPTION OF THE INVENTION

Figure 1:
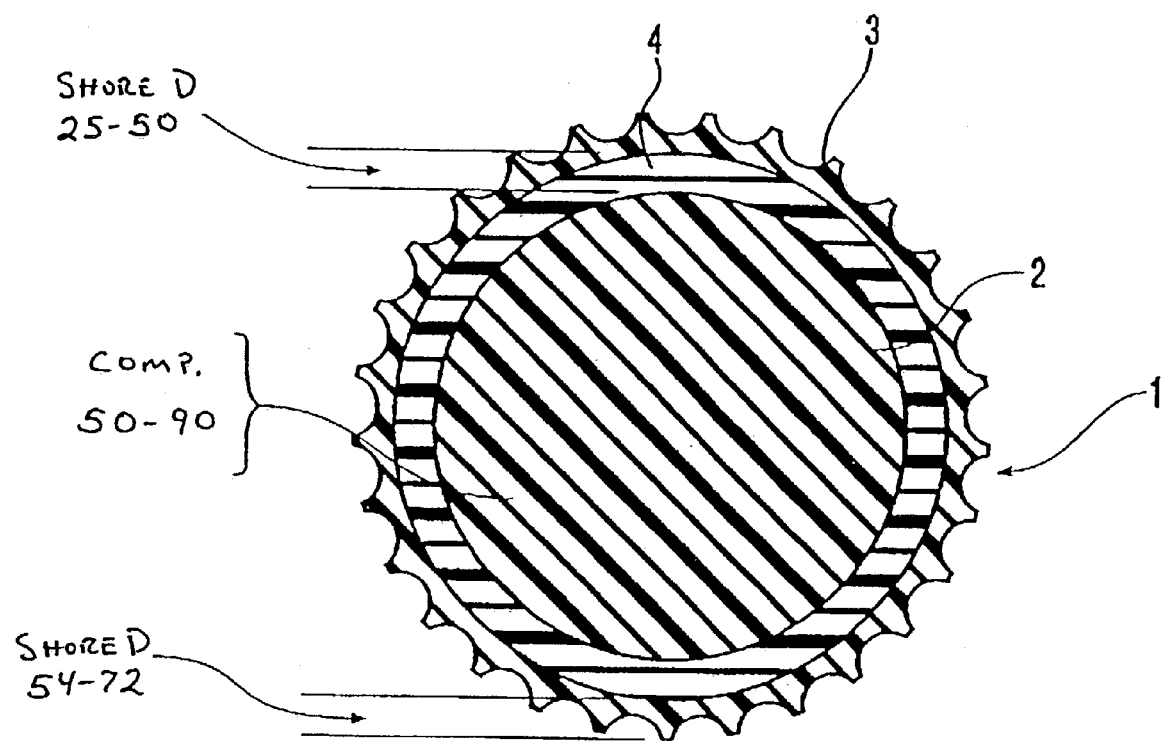
FIG. 1 is a cross-sectional view of one embodiment of a golf ball according to the present invention.

The present invention is directed to golf balls including thermoplastic and thermoset compositions. In particular, the golf balls of the invention may include thermoplastic or thermoset polyurethane or polyurea compositions in an intermediate layer, inner cover layer, outer cover layer, core layer(s), and combinations thereof. For example, the invention relates to golf balls formed, at least in part, from a composition including the reaction product of at least one diisocyanate and at least one polyol or amine-terminated component, and a curing agent of at least one diol or a secondary diamine, wherein the resultant golf ball possesses improved resiliency and initial velocity as well as durability. In addition, the compositions of the invention may be used for producing golf-related equipment, such as in an insert for a golf club, as well as in the golf balls discussed herein.

Compositions of the Invention

The compositions of the invention may be polyurethane-based, i.e., a product of a reaction between at least one diisocyanate, polyol, and curing agent. In addition, the compositions of the invention may be polyurea-based, i.e., a product of a reaction between at least one amine-terminated component, diisocyanate, and curing agent.

Isocyanate Component

Isocyanates for use with the polyurethane prepolymer include aliphatic, cycloaliphatic, aralphatic, derivatives thereof, and combinations of these compounds having two or more isocyanate (NCO) groups per molecule. The isocyanates may be organic, modified organic, organic polyisocyanate-terminated prepolymers, and mixtures thereof. The isocyanate-containing reactable component may also include any isocyanate-functional monomer, dimer, trimer, or multimeric adduct thereof, prepolymer, low free isocyanate prepolymer, quasi-prepolymer, or mixtures thereof.

Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic or linear or branched hydrocarbon moiety containing from about 1 to 20 carbon atoms. The diisocyanate may also contain one or more cyclic groups. When multiple cyclic groups are present, linear and/or branched hydrocarbons containing from about 1 to 10 carbon atoms can be present as spacers between the cyclic groups. In some cases, the cyclic group(s) may be substituted at the 2-, 3-, and/or 4-positions, respectively. Substituted groups may include, but are not limited to, halogens, primary, secondary, or tertiary hydrocarbon groups, or a mixture thereof.

Unsaturated diisocyanates, i.e., aromatic compounds, may also be used with the present invention, although the use of unsaturated compounds in the prepolymer is preferably coupled with the use of a light stabilizer or pigment as discussed below. Examples of unsaturated diisocyanates include, but are not limited to, substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI, carbodimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4"-triisocyanate, napthylene-1,5-,diisocyanate (NDI), 2,4'-, 4,4'-, and 2,2-biphenyl diisocyanate, polyphenyl polymethylene polyisocyanate (PMDI), and mixtures thereof.

Examples of saturated diisocyanates that can be used in the polyurethane prepolymer include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In one embodiment, the saturated diisocyanates include isophorone diisocyanate (IPDI), 4,4'-dicyclohexylmethane diisocyanate ($H_{12}$MDI), 1,6-hexamethylene diisocyanate (HDI), or a combination thereof.

Prepolymers may contain about 10 percent to about 20 percent by weight of the low free isocyanate monomer. Thus, in one embodiment, the prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer. In still another embodiment, the prepolymer contains about 0.1 percent or less free isocyanate monomer.

When the composition of the invention is thermoplastic, suitable diisocyanates for use in the present invention include 2,2'-diphenylmethane diisocyanate, 2,4'-diphenylmethane diisocyanate, 4,4'-diphenylmethane diisocyanate ("MDI"); polymeric MDI; liquid MDI; toluene diisocyanate ("TDI"); 3,3'-dimethyl-4,4'-biphenylene diisocyanate ("TODI"); para-phenylene diisocyanate ("PPDI"); isophorone diisocyanate ("IPDT"); 4,4'-dicyclohexylmethane diisocyanate ("$H_{12}$MDI"); 1,6-hexamethylene diisocyanate ("HDI"); p-tetramethylxylene diisocyanate ("p-TMXDI"); m-tetramethylxylene diisocyanate ("m-TMXDI"); naphthalene diisocyanate ("NDI"); m-phenylene diisocyanate ("MPDI"); and mixtures thereof. In one embodiment, the prepolymer contains about 0.1 percent or less free isocyanate monomer.

In another embodiment, the diisocyanate is an aromatic diisocyanate containing about 4 to about 20 carbon atoms. Non-limiting examples include 1,4-diisocyanatobenzene (PPDI), 1,5-naphthalene diisocyanate, xylene diisocyanate, isomers of toulene diisocyanate, or most preferably, 2,2' methylenebis(phenylisocyanate), 2,4' methylenebis(phenylisocyanate), 4,4' methylenebis(phenylisocyanate), isomers thereof or oligomers thereof. Acceptable aliphatic diisocyanates include 1,6-hexamethylene diisocyanate, isophorone diisocyanate, methylene bis(4-cyclohexylisocyanate) 1,4-cyclohexyl diisocyanate and the like.

The diisocyanate is preferably present in an amount from about 2.5 to about 15 percent by weight of the prepolymer, and more preferably, from about 2.5 to about 14 percent by weight of the prepolymer. In one embodiment, the diisocyanate is present in an amount from about 5 to about 12 percent by weight of the prepolymer. In another embodiment, prepolymer contains about 5 percent to about 10 percent by weight of diiscyanate.

Polyol Component

Any polyol available to one of ordinary skill in the art is suitable for use in the polyurethane prepolymer. Suitable polyols include, but are not limited to, polyether polyols, polyester polyols, polycaprolactone polyols, polycarbonate polyols, hydrocarbon polyols, and mixtures thereof.

Examples of suitable polyether polyols include, but are not limited to, polytetramethylene ether glycol (PTMEG), copolymer of polytetramethylene ether glycol and 2-methyl-1,4-butane diol (PTG-L), poly(oxyethylene)glycol, poly(oxypropylene)glycol, poly(oxyethylene oxypropylene)glycol, ethylene oxide capped poly(oxypropylene)glycol, and mixtures thereof. Commercially available polyether-type polyurethanes are available from B.F. Goodrich under the names ESTANE 5740X820 and 5740X955. Both materials having a Shore D hardness of less than 30, a flexural modulus of less than 5,000 psi and a percent rebound resilience of greater than about 45 percent.

Suitable polyester polyols include, but are not limited to, o-phthalate-1,6-hexanediol, polyethylene adipate glycol, polyethylene propylene adipate glycol, polyethylene butylene adipate glycol, polybutylene adipate glycol, polyhexamethylene adipate glycol, polyhexamethylene butylene adipate glycol, polyethylene terephthalate polyester polyol, and mixtures thereof.

Suitable polycaprolactone polyols include, but are not limited to, ethylene glycol initiated polycaprolactone; diethylene glycol initiated polycaprolactone; propylene glycol initiated polycaprolactone; dipropylene glycol initiated polycaprolactone; trimethylol propane initiated polycaprolactone; neopentyl glycol initiated polycaprolactone; 1,4-butanediol-initiated polycaprolactone; 1,6-hexanediol-initiated polycaprolactone; polytetramethylene ether glycol (PTMEG) initiated polycaprolactone; copolymers thereof; and mixtures thereof. As used herein, the term "copolymer" refers to a polymer that is formed from two or more monomers, wherein said monomers are not identical.

Examples of polycarbonate polyols that may be used with the present invention include, but are not limited to, poly (phthalate carbonate)glycol, poly(hexamethylene carbonate) glycol polycarbonate polyols containing bisphenol A, and mixtures thereof. Hydrocarbon polyols include, but are not limited to, hydroxy-terminated liquid isoprene rubber (LIR), hydroxy-terminated polybutadiene polyol, hydroxy-terminated polyolefin polyols, hydroxy-terminated hydrocarbon polyols, and mixtures thereof. Other aliphatic polyols that may be used to form the prepolymer of the invention include, but are not limited to, glycerols; castor oil and its derivatives; Polytail H; Polytail HA; Kraton polyols; acrylic polyols; acid functionalized polyols based on a carboxylic, sulfonic, or phosphoric acid group; dimer alcohols converted from the saturated dimerized fatty acid; and mixtures thereof.

Suitable moisture resistant polyols include saturated and unsaturated hydrocarbon polyols, hydroxy-terminated liquid isoprene rubber, hydroxy-terminated polybutadiene polyol; copolymers and mixtures thereof.

In one embodiment, preferred polyols for use with the invention include, polytetramethylene ether glycol, polyethylene adipate glycol polybutylene adipate glycol, and diethylene glycol initiated polycaprolactone; copolymers and mixtures there of. In another embodiment, the polyol has a molecular weight from about 200 to 4000.

In yet another embodiment, the polyol is a hydroxyl terminated polyether with alkylene oxide repeat units containing from 2 to 6 carbon atoms and an average molecular weight of about 1,400 to about 10,000, preferably about 2,500 to about 10,000. The term "about," as used herein in connection with one or more numbers or numerical ranges, should be understood to refer to all such numbers, including all numbers in a range. In this aspect of the invention, representative alkylene oxide repeat group with 2 to 6 carbon atoms include, but are not limited to, ethylene oxide or propylene oxide with 4 carbon atoms. In one embodiment, tetramethylene, butylene oxide, and mixtures thereof are chosen as the alkylene oxide repeat units. Examples of commercially available hydroxyl terminated polyethers include Polymeg 2000 from Lyondell Chemical Co. and Terethane 2900 from DuPont.

Preferably, the polyol is present in an amount of about 70 to 98 percent by weight of the diisocyanate and the polyol, the diisocyanate is present in an amount of about 2 to 30 percent by weight of the diisocyanate and the polyol, and the diol and/or secondary diamine curing agent is present in an amount of about 10 to 110 weight percent of the diisocyanate and the polyol.

Amine-Terminated Component

Any amine-terminated component available to one of ordinary skill in the art is suitable for use in making a polyurea prepolymer of the invention. The amine-terminated component may include amine-terminated hydrocarbons, amine-terminated polyethers, amine-terminated polyesters, amine-terminated carbonates, amine-terminated caprolactones, and mixtures thereof, as detailed in co-pending U.S. patent application Ser. No. 10/409,144, filed Apr. 9, 2003, entitled "Polyurea and Polyurethane Compositions for Golf Equipment" and U.S. Pat. No. 10/228,311, filed Aug. 27, 2002, entitled "Golf Balls Comprising Light Stable Materials and Methods of Making Same," which are incorporated by reference herein in their entirety. The amine-terminated segment may be in the form of a primary amine ($NH_2$) or a secondary amine (NHR). It is important to note that the use of an amine-terminated component in place of a polyol creates a polyurea prepolymer with only urea linkages. However, if the prepolymer includes low free isocyanate monomer and a hydroxy-terminated compound such as the polyols listed above are blended with the prepolymer, the resultant prepolymer will contain urethane linkages. Thus, the only way to achieve a pure polyurea composition is to ensure no urethane linkages are present in the composition.

Curing Agent

Curatives for use with the present invention include, but are not limited to, hydroxy terminated curing agents, amine-terminated curing agents, and mixtures thereof. Depending on the type of curing agent used, the polyurethane composition may be thermoplastic or thermoset in nature. For example, polyurethanes prepolymers cured with a diol or secondary diamine with 1:1 stoichiometry are generally thermoplastic in nature. Thermoset polyurethanes, on the other hand, are generally produced from a prepolymer cured with a primary diamine or polyfunctional glycol.

In one embodiment, the compositions of the invention contain a single curing agent. In another embodiment, the compositions of the invention contain a mixture of curing agents. In yet another embodiment, the polyurethane composition contains a single diol curing agent.

In addition, the type of curing agent used determines whether the polyurethane composition is polyurethane-urethane, polyurethane-urea, polyurea-urea, or polyurea-urethane. For example, a polyurethane prepolymer cured with a hydroxy-terminated curing agent is polyurethane-urethane because any excess isocyanate groups will react with the hydroxyl groups of the curing agent to create more urethane linkages. In contrast, if an amine-terminated curing agent is used with the polyurethane prepolymer, the excess isocyanate groups will react with the amine groups of the amine-terminated curing agent to create urea linkages.

In one embodiment, the curing agent has one of the following chemical structures:

$$HO\text{—}(R_1\text{—}R_2)\text{—}OH,$$

$$HNR\text{—}(R_1\text{—}R_2)_n\text{—}NHR,$$

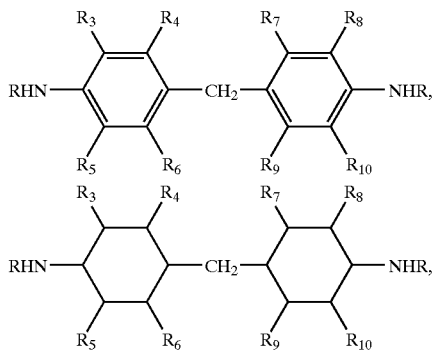

and mixtures thereof, wherein R includes alkyl groups, such as methyl, ethyl, propyl, butyl, and ethyl maleate groups, wherein $R_1$ and $R_2$ individually include linear or branched hydrocarbon chains having about 1 to about 20 carbon atoms, wherein $R_3$, $R_4$, $R_5$, $R_6$, $R_7$, $R_8$, $R_9$, and $R_{10}$ include a hydrogen atom, a methyl group, an ethyl group, a propyl group, a butyl group, or mixtures thereof, and wherein n ranges from about 1 to about 20.

Suitable hydroxy-terminated curing agents include, but are not limited to, ethylene glycol; diethylene glycol; polyethylene glycol; propylene glycol; 2-methyl-1,3-propanediol; 2-methyl-1,4-butanediol; dipropylene glycol; polypropylene glycol; ethanediol; 1,2-butanediol; 1,3-butanediol; 1,4-butanediol; 2,3-butanediol; 2,3-dimethyl-2,3-butanediol; trimethylolpropane; triisopropanolamine; diethylene glycol di-(aminopropyl)ether; 1,5-pentanediol; 1,6-hexanediol; cyclohexane diol; glycerol; 1,3-bis-(2-hydroxyethoxy)cyclohexane; 1,3-[bis-(2-hydroxyethoxy)]-diethoxy benzene; 1,4-cyclohexyldimethylol; 1,3-[2-(2-hydroxyethoxy)ethoxy]cyclohexane; 1,3-bis-{2-[2-(2-hydroxyethoxy)ethoxy]ethoxy}cyclohexane; polytetramethylene ether glycol having molecular weight ranging from about 250 to about 3900, preferably about 250 to about 1000; and mixtures thereof. It is well known in the art that 1,3-[bis-(2-hydroxyethoxy)]-diethoxy benzene may also be referred to as 2,2'-[1,3-phenylenebis oxy-2,1-ethanediyloxy]bis-ethanol.

In one embodiment, the composition of the invention is a thermoplastic polyurethane that includes a reaction product of 4,4'-diphenylmethane diisocyanate; polytetramethylene ether glycol; and mixtures of 1,3-bis-(2-hydroxyethoxy) benzene and 1,3-[bis-(2-hydroxyethoxy)]-diethoxy benzene.

The hydroxy-terminated curing agent preferably has a molecular weight of at least about 50. In one embodiment, the molecular weight of the hydroxy-terminated curing agent is about 2000 or less. In yet another embodiment, the hydroxy-terminated curing agent has a molecular weight of about 250 to about 3900. It should be understood that molecular weight, as used herein, is the absolute weight average molecular weight and would be understood as such by one of ordinary skill in the art.

When the curing agents are glycol chain extenders, i.e., glycol, ethylene glycol, propane glycol, butane glycol, pentane glycol, hexane glycol, benzene glycol, and xylene glycol, they are preferably straight chain. The total weight of any branches of the chain extenders based on all of the weight of all the chain extenders is preferably less than about 15 percent by weight. The curing agent may be aliphatic, aromatic, or a mixture thereof. The hydroxy-terminated curing agents may be selected from the polyols discussed above with respect to the prepolymer component of the compositions of the invention. For example, in one embodiment, the curing agent is a polyether polyol or hydroxy-terminated curing agent having the following structure:

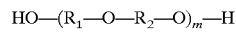

where $R_1$ and $R_2$ are linear or branched hydrocarbon chains having about 1 to about 20 carbon atoms, and wherein n ranges from about 1 to about 45. The polyether polyol may include polytetramethylene ether glycol, poly(oxypropylene)glycol, poly(oxyethylene glycol), poly(oxyethylene oxypropylene)glycol, ethylene oxide capped poly(oxypropylene)glycol, and mixtures thereof. For example, a polyurethane composition of the invention may include PPDI and PTMEG, wherein the composition has a hardness of about 40 Shore D or greater, preferably about 45 Shore D to about 70 Shore D.

In another embodiment, the curing agent is a polyester polyol or hydroxy-terminated curing agent having the following structure:

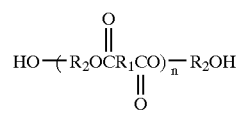

wherein $R_1$ and $R_2$ comprise linear or branched hydrocarbon chains having about 1 to about 20 carbon atoms, and wherein n ranges from about 1 to about 25. The polyester polyol may include o-phthalate-1,6-hexanediol, polyethylene adipate glycol, polyethylene propylene adipate glycol, polyethylene butylene adipate glycol, and mixtures thereof.

In yet another embodiment, the curing agent is a polycaprolactone polyol or hydroxy-terminated curing agent having the following structure:

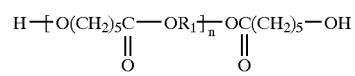

wherein $R_1$ includes linear or branched hydrocarbon chains having about 1 to about 20 carbon atoms, and wherein n ranges from about 1 to about 25. The polycaprolactone polyol may include 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, polytetramethylene ether glycol (PTMEG) initiated polycaprolactone, and mixtures thereof. For example, a polyurethane composition of the invention may include PPDI and polycaprolactone polyol, wherein the composition has a hardness of about 40 Shore D or greater, preferably about 45 Shore D to about 70 Shore D.

In still another embodiment, the curing agent is a polycarbonate polyol or hydroxy-terminated curing agent having the following structure:

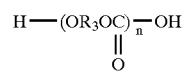

and mixtures thereof, wherein $R_3$ comprises at least one phthlatate group, at least one hexamethylene group, at least one bisphenol A group, or combinations thereof, and wherein n ranges from about 1 to about 25. The polycarbonate polyol may include poly(phthalate carbonate)glycol, poly(hexamethylene carbonate)glycol, polycarbonate polyols containing bisphenol A, and mixtures thereof In another embodiment, the curing agent is a diol having the following general chemical structure:

$$HOH_2CH_2C(OH_2CH2C)_nO\text{—}X\text{—}O(CH_2CH_2O)_mCH_2CH_2OH$$

where n and m each separately have values of 0, 1, 2, or 3, and where X is o-phenylene, m-phenylene, p-phenylene, 1,2-cyclohexyl, 1,3-cyclohexyl, or 1,4-cyclohexyl. The values of n and m are preferably 1 or 2. The various phenylene structures are depicted below:

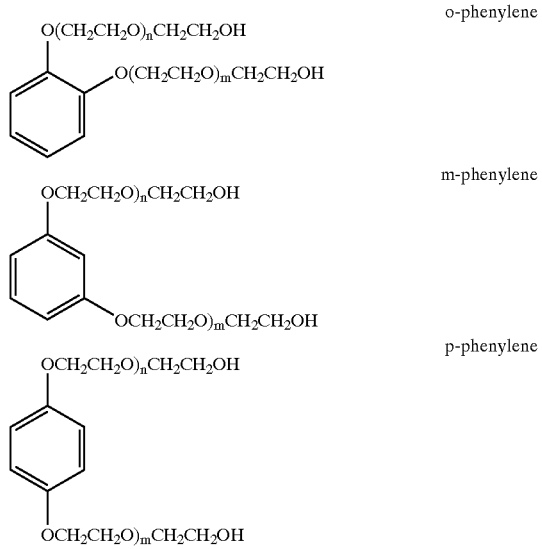

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; derivatives of 4,4'-bis-(sec-butylamino)-dicyclohexylmethane; 4,4'-bis-(sec-butylamino)-diphenylmethane; derivatives of 4,4'-bis-(sec-butylamino)-diphenylmethane; 1,4-bis-(sec-butylamino)-cyclohexane; 1,4-bis-(sec-butylamino)-benzene; 1,2-bis-(sec-butylamino)-cyclohexane; 1,2-bis-(sec-butylamino)-benzene; 4,4'-dicyclohexylmethane diamine; 1,4-cyclohexane-bis-(methylamine); 1,3-cyclohexane-bis-(methylamine); diethylene glycol di-(aminopropyl) ether; N,N'-diisopropyl-isophorone diamine; 3,3'-dimethyl-4,4'-dicyclohexylmethane diamine; 2-methylpentamethylene-diamine; diaminocyclohexane; diethylene triamine; triethylene tetramine; tetraethylene pentamine; propylene diamine; dipropylene triamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; and mixtures thereof. In one embodiment, the amine-curing agent has a molecular weight of about 64 or greater. In another embodiment, the molecular weight of the amine-curing agent is about 2000 or less.

For example, in one embodiment, the composition of the invention is a thermoplastic polyurethane that includes a reaction product of 4,4'-dicyclohexylmethane diisocyanate, copolymer of polytetramethylene ether glycol and polycaprolactone, and 4,4'-bis-(sec-butylamino)-dicyclohexylmethane.

The amine-terminated curing agent may also be selected from any of the amine-terminated components listed above with respect to the prepolymer. For example, the amine-terminated curing agent may include amine-terminated polyethers, amine-terminated, polyesters, amine-terminated polycarbonates, amine-terminated polycaprolactones, and mixtures thereof In one embodiment, the amine-terminated curing agent is a primary amine, e.g, containing two $NH_2$ groups. In another embodiment, the amine-terminated curing agent is a secondary amine or hindered amine, e.g., containing at least one NHR group.

Additional examples of suitable polyurethanes and polyureas for use with the present invention may be found in U.S. Patent Publication No. 2003/0088048, U.S. patent application Ser. No. 10/228,311, filed Aug. 27, 2002, entitled "Golf Balls Comprising Light Stable Materials and Methods of Making Same," U.S. patent application Ser. No. 10/339,603, filed Jan. 10, 2003, entitled "Polyurethane Compositions for Golf Balls," U.S. patent application Ser. No. 10/409,144, filed Apr. 9, 2003, entitled "Polyurea and Polyurethane Compositions for Golf Equipment," and U.S. patent application Ser. No. 10/409,092, filed Apr. 9, 2003, entitled "Water Resistant Polyurea Elastomers for Golf Equipment," the entire disclosures of which are incorporated by reference herein.

Composition Processing

There are two basic techniques used to process the polyurethane and polyurea elastomers of the present invention: the one-shot technique and the prepolymer technique. The one-shot technique reacts the composition materials in one step, whereas the prepolymer technique requires a first reaction between the polyol and a diisocyanate to produce a polyurethane prepolymer or a first reaction between the amine-terminated compound and a diisocyanate to produce a polyurea prepolymer, and a subsequent reaction between the prepolymer and a curing agent. Either method may be employed to produce the polyurethane compositions of the invention, however, the prepolymer technique allows better control of chemical reaction and, consequently, may result in more uniform properties for the elastomers.

In one embodiment, the compositions of the invention are formed from a one-shot method by feeding: the diisocyanate monomer and then feeding at least one curing agent into an extruder to produce thermoplastic compositions for use in the golf balls of the invention. For example, melted PPDI monomer and curatives, such as PTMEG, polycaprolactone, and the like, may be fed into an extruder to make thermoplastic PPDI-based polyurethanes.

Composition Blends

The compositions of the invention may be blended with other materials. For example, the compositions of the invention may be blended with an additional thermoplastic component. Suitable thermoplastic materials include, but are not limited to, copolyesters, polyamides, polyetherester block copolymers, polyesterester block copolymers, polyetheramide block copolymers, polyesteramide block copolymers, ionomer resins, dynamically vulcanized thermoplastic elastomers, hydrogenated styrene-butadiene elastomers with functional groups such as maleic anhydride or sulfonic acid attached, thermoplastic polyesters, polymers formed using a metallocene catalyst ("metallocene polymers") and mixtures thereof.

Suitable thermoplastic polyetherester block copolymers include materials that are commercially available from DuPont of Wilmington, Del., under the tradename HYTREL® and include HYTREL® 3078, HYTREL® G3548W, HYTREL® 4069 and HYTREL® G4078W. Suitable thermoplastic polyetheramide block copolymers are commercially available from Elf-Atochem of Philadelphia, Pa., under the tradename PEBAX and include PEBAX® 2533, PEBAX® 1205 and PEBAX® 4033. Suitable thermoplastic ionomer resins include any number of olefinic-based ionomers such as SURLYN® (DuPont) and IOTEK® (Exxon). Suitable dynamically vulcanized thermoplastic elastomers include SANTOPRENE®, SARLINK®, VYRAM®, DYTRON®, and VISTAFLEX®. SANTOPRENE® is the trademark for a dynamically vulcanized PP/EPDM. SANTOPRENE® 203-40 is an example of a preferred SANTOPRENE® and is commercially available from Advanced Elastomer Systems. Examples of suitable functionalized hydrogenated styrene-butadiene elastomers having functional groups such as maleic anhydride or sulfonic acid, include KRATON® FG-1901x and FG-1921x, which are commercially available from the Shell Corporation. Examples of suitable thermoplastic polyurethanes include ESTANE® 58133, ESTANE® 58134 and ESTANE® 58144, which are commercially available from the B.F. Goodrich Company of Cleveland, Ohio. Suitable metallocene-catalyzed polymers, i.e., polymers formed with a metallocene catalyst, include those commercially available from EXXON and DOW. Suitable thermoplastic polyesters include poly(butylene terephthalate), poly(ethylene terephthalate), and poly(trimethylene terephthalate).

In one embodiment, a composition is formed according to the invention by reacting a diisocyanate with a hydroxyl terminated polyether and a glycol chain extender and further blended with a thermoplastic selected from the group of copolyesters, polyamides, polyetherester block copolymers, polyesterester block copolymers, polyetheramide block copolymers, polyesteramide block copolymers, other polyurethanes (such as poly(p-phenylene diisocyanate-ether)urethane and polyester-type urethane), and mixtures thereof. The resulting material preferably has a flexural modulus less than about 20,000 psi. In another embodiment, the thermoplastic component of the blend includes polyetherester block copolymer, preferably HYTREL 4069.

Additional Components

Additional materials may be added to the polyurethane and polyurea prepolymers, i.e., the reaction product of diisocyanate and the polyol or amine-terminated compound, or to the finished polyurethane compositions of the invention. These additional materials include, but are not limited to, catalysts, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, compatibilizers, catalysts, fragrance components, and mixtures thereof may also be added to any composition of the invention. Those of ordinary skill in the art are aware of the purpose of these additives and the amounts that should be employed to fulfill those purposes.

For example, filler components may be chosen to impart additional density to blends of the previously described components. The selection of such fillers is dependent upon the type of golf ball desired, i.e., one-piece, two-piece multi-component, or wound. Examples of useful fillers include zinc oxide, barium sulfate, calcium oxide, calcium carbonate and silica, as well as the other well known corresponding salts and oxides thereof. Additional fillers, such as foaming agents, glass spheres, and metal, can be added to the polyurethane compositions of the present invention, in amounts as needed, for their well-known purposes.

A catalyst may also be employed to promote the reaction between the prepolymer and the curing agent for both the polyurethane and polyurea compositions. Suitable catalysts include, but are not limited to bismuth catalyst; cobalt (II) octoate; zinc octoate; stannous octoate; tin catalysts such as di-butyltin dilaurate (DABCO® T-12 manufactured by Air Products and Chemicals, Inc.), di-butyltin diacetate (DABCO® T-1); stannous octoate (DABCO® T-9); tin (II) chloride, tin (IV) chloride, di-butyltin dimethoxide (FAS-CAT®-4211), dimethyl-bis[1-oxonedecyl)oxy]stannane (FORMEZ® (UL-28), di-n-octyltin bis-isooctyl mercaptoacetate (FORMEZ® UL-29); amine catalysts such as triethylenediamine (DABCO® 33-LV), triethylamine, and tributylamine; organic acids such as octanoic acid, oleic acid, and acetic acid; delayed catalysts such as POLYCAT® SA-1, POLYCAT® SA-2, POLYCAT®, and the like; and mixtures thereof. In one embodiment, the catalyst is di-butyltin dilaurate.

When used, a catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as di-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

As briefly mentioned above, the compositions of the invention may be foamed by the addition of at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Useful blowing or foaming agents include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful.

A fragrance or masking component may be added to the compositions of the invention to eliminate odors inherent to some compositions of the invention. As used herein, a material or component is odorous when the odor threshold surpasses a threshold of 0.029 mg/m$^3$ in air. Thus, a fragrance component may be added in an amount of about 0.01 percent to about 1.5 percent by weight of the composition. In one embodiment, the fragrance component is added to the composition in an amount of about 0.03 percent or greater by weight of the composition. In another embodiment, the fragrance component is added to the composition in an amount of about 1.2 percent or less by weight of the composition. In yet another embodiment, the fragrance component is added in an amount of about 0.5 percent to about 1 percent by weight of the composition. For example, an optimum loading of the fragrance component may be about 0.08 percent by weight of the composition, but adding more may enhance the effect is needed.

Suitable fragrance components include, but are not limited to, Long Lasting Fragrance Mask #59672, Long Lasting Fragrance Mask #46064, Long Lasting Fragrance Mask #55248, Non-Descript Fragrance Mask #97779, Fresh and Clean Fragrance Mask #88177, and Garden Fresh Fragrance Mask #87473, all of which are manufactured by Stanley S. Schoemann, Inc. of Clark, N.J. Other non-limiting examples of fragrance components that may be added to the compositions of the invention include benzaldehyde, benzyl benzoate, benzyl propionate, benzyl salicylate, benzyl alcohol, cinnamic aldehydes, Polyscent® maskants distributed by Flavor and Fragrance Specialties of New Jersey. natural and essential oils derived from botanical sources, and mixtures thereof.

Acid Functionalization

The present invention also contemplates the acid functionalization of the polyurethane and polyurea compositions of the invention to increase adhesion as disclosed in U.S. patent application Ser. No. 10/072,395, filed on Feb. 5, 2002, entitled "Golf Ball Compositions Comprising a Novel Acid Functional Polyurethane, Polyurea, or Copolymer Thereof", which is incorporated by reference herein in its entirety. The acid functional group is preferably based on a sulfonic group ($HSO_3$), carboxylic group ($HCO_2$), phosphoric acid group ($H_2PO_3$), or a combination thereof.

In one embodiment, the acid functional polyurea or polyurethane is prepared from a prepolymer having acid functional moieties. The acid group(s) may be incorporated onto the isocyanate moiety or polyol component when making a polyurethane composition. When making a polyurea composition of the invention, the acid group(s) may be incorporated onto the isocyanate or polyether amine component.

Suitable acid functional polyols for use in the polyurethane compositions of the invention, along with reagents and methods used to derive such acid functional polyols, are disclosed in detail in U.S. Pat. Nos. 5,661,207 and 6,103,822, the disclosures of which are incorporated herein by reference in their entirety. In one embodiment, acid functional polyols for use in a polyurethane prepolymer includes carboxylated, sulfonated, or phosphonated derivatives of polyester polyols. Suitable acid functional polyols may have an acid number (calculated by dividing acid equivalent weight to 56,100) of at least about 10, preferably from about 20 to about 420, more preferably from about 25 to about 150, and most preferably from about 30 to about 75. In addition, the hydroxyl number (calculated by dividing hydroxyl equivalent number to 56,100) of the polyols may be at least about 10, preferably from about 20 to about 840, and more preferably from about 20 to about 175, and most preferably from about 50 to about 150. The polyols may also have a hydroxyl functionality (average number of hydroxyl groups per polyol molecule) of at least about 1.8, preferably from about 2 to about 4.

Suitable acid functional isocyanates include conventional isocyanates having an acid functional group that may be formed by reacting an isocyanate and an acid functional group containing compound as described in U.S. Pat. Nos. 4,956,438 and 5,071,578, the disclosures of which are incorporated herein by reference in their entirety.

The acid group(s) may also be incorporated during a post-polymerization reaction, wherein the acid functional group(s) is introduced or attached to the polyurea or polyurethane. Moreover, the acid functional polyurea or polyurethanes made by way of copolymerization as described above may be further incorporated with additional acid functional groups through such post-polymerization reactions. Suitable agents to incorporate acid functional groups onto the polyurea or polyurethane and methods for making are described in U.S. Pat. No. 6,207,784, the entire disclosure of which is incorporated by reference herein.

One of ordinary skill in the art would be aware of other ways to prepare the acid functional polyurea or polyurethane. For example, a combination of the embodiments described above may be used as described in U.S. Pat. No. 5,661,207, the disclosure of which is incorporated by reference in its entirety herein.

The acid functional polyurethanes or polyurea may be partially or fully neutralized with an organic or an inorganic metal base and/or a tertiary amine to produce anionic polyurethanes/polyurea ionomers. The base may be added during preparation of the prepolymer or as a separate neutralization step on the already polymerized acid functional polyurethane and polyurea. If these stages occur simultaneously, the base is preferably present throughout all stages.

Suitable metal bases used for partial or total neutralization may include compounds such as metal oxides, metal hydroxides, metal carbonates, metal bicarbonates and metal acetates. The metal ions may include, but are not be limited to, Group IA, IB, IIA, IIB, IIIA, IIIB, IVA, IVB, VA, VB, VIA, VIB, VIIB and VIIIB metal ions. Preferred metallic ions of such bases include lithium, sodium, potassium, magnesium, zinc, calcium, manganese, aluminum, tungsten, zirconium, titanium and hafnium. The amines are preferably hindered organic tertiary amines such as tributylamine, triethylamine, triethylene diamine, dimethyl cetylamine and similar compounds. Primary or secondary amines may be used, preferably only if the neutralization step takes place after the polymer is formed, because the amine hydrogen will readily react with the isocyanate groups thereby interfering with the polyurea or polyurethane polymerization. One of ordinary skill in the art is aware of additional appropriate chemicals for neutralization.

Golf Ball Construction

The compositions of the present invention may be used with any type of ball construction. For example, golf balls formed according to the invention may have a one-piece construction formed from a homogeneous mass consisting entirely of the compositions of the invention. Such balls may further include, if desired, blends of conventional materials, such as those discussed herein. One-piece balls, formed with the compositions of the invention, are quite durable, but do not provide great distance because of relatively high spin and low velocity.

Thus, another aspect of the present invention relates to two-piece and three-piece designs, as well as golf balls having a double core, a double cover, an intermediate layer(s), a multilayer core, and/or a multilayer cover. As used herein, the term "multilayer" means at least two layers. For example, the compositions of the invention may be used in a core, intermediate layer, and/or cover of a golf ball, each of which may have a single layer or multiple layers. As shown in FIG. 1, the golf balls of the invention may include a core 2, a cover 3, and at least one intermediate layer 4 disposed between the core 2 and the cover 3. As appreciated by those of ordinary skill in the art, the construction of the golf ball depends on the type of performance desired of the ball.

Core Component(s)

Figure 2:
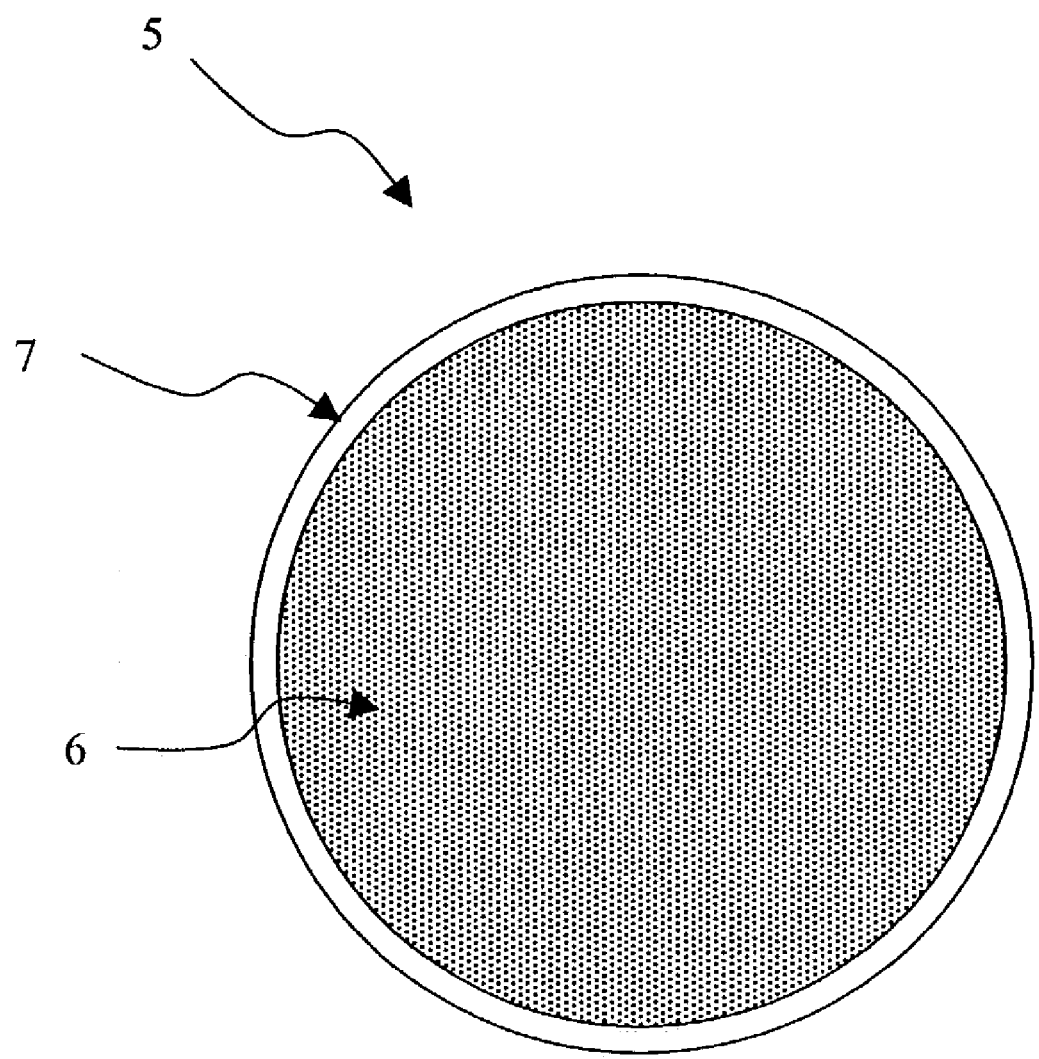
FIG. 2 is a cross-sectional view of a multilayer golf ball including a large core and a thin outer cover layer disposed thereon according to an embodiment of the present invention.

A core for use with the present invention may be a one-piece core or a multilayer core, both of which may be solid, semi-solid, gelled, hollow, fluid-filled, or powder-filled. A multilayer core is one that has an innermost component with an additional core layer or additional core layers disposed thereon. As used herein, the term "golf ball core" can be used to refer to any portion of a golf ball contained within the cover. For example, FIG. 2 shows a golf ball 5 having a core 6 and a cover 7. In the case of a golf ball having three or more layers, the term "golf ball core" may include at least one inner layer and typically refers to a center and at least one other layer disposed beneath the cover. Such balls are known as "dual core" golf balls. The term "inner core" may be used interchangeably with "center" or "golf ball center", while the term "outer core" may be used interchangeably with "intermediate layer" or "at least one intermediate layer."

While the compositions of the invention may be used in cores of the present invention golf balls, other conventional compositions may also be used. For example, a non-limiting representative base composition for forming the cores employed in the present invention includes polybutadiene and about 20 to about 50 parts by weight (based on 100 parts polybutadiene) of a metal salt of an α,β-unsaturated carboxylic acid, such as diacrylate, dimethacrylate, or monomethacrylate. In one embodiment, the metal salt of an α,β-unsaturated carboxylic acid is zinc diacrylate. The polybutadiene preferably has a cis-1,4 content of above about 90 percent and more preferably above about 96 percent. Commercial sources of polybutadiene include SHELL 1220 manufactured by Shell Chemical, NEOCIS BR40 manufactured by Enichem Elastomers, and UBEPOL BR150 manufactured by Ube Industries, Ltd.

Various combinations of polymers, cis-to-trans catalysts, fillers, crosslinkers, and a source of free radicals, such as those disclosed in co-pending and co-assigned U.S. patent application Ser. No. 10/190,705, entitled "Low Compression, Resilient Golf Balls With Rubber Core," filed Jul. 9, 2002, the entire disclosure of which is incorporated by reference herein, may be used to form a suitable polybutadiene reaction product for use in the core. And, although this polybutadiene reaction product is discussed in a section pertaining to core compositions, the present invention also contemplates the use of the polybutadiene reaction product to form at least a portion of any component of a golf ball.

Thus, in one embodiment, the golf ball of FIG. 2 represents a core 6 of polybutadiene reaction material or other conventional materials and a cover 7. The cover may be formed of the polyurethane composition of the invention. In one embodiment, the cover 7 is formed of the composition of the invention wherein the isocyanate includes PPDI monomer.

The polybutadiene may be mixed with other elastomers known in the art, such as natural rubber, styrene butadiene, and/or isoprene rubber in order to further modify the properties of the core. In this aspect of the invention, the amounts of other constituents in the core composition are usually based on 100 parts by weight of the total elastomer mixture.

Metal salt diacrylates, dimethacrylates, and monomethacrylates suitable for use in the cores employed in this invention include those wherein the metal is magnesium, calcium, zinc, aluminum, sodium, lithium or nickel. Zinc diacrylate is preferred, because it provides golf balls with a high initial velocity in the USGA test. The zinc diacrylate can be of various grades of purity. For the purposes of this invention, the lower the quantity of zinc stearate present in the zinc diacrylate, the higher the zinc diacrylate purity. In one embodiment, zinc diacrylate containing less than about 10 percent zinc stearate is used. In another embodiment, zinc diacrylate containing about 4–8% zinc stearate is used. One example of a suitable commercially available zinc diacrylate is available from Sartomer.

Zinc diacrylate is preferably present in the polybutadiene reaction product in an amount of about 20 pph to about 50 pph based upon 100 pph of polybutadiene. As used herein, the term "pph" in connection with a batch formulation refers to parts by weight of the constituent per hundred parts of the base composition. In another embodiment, zinc diacrylate is present in an amount of about 20 pph to about 50 pph based on 100 pph of a polybutadiene-elastomer mixture.

Suitable cis-to-trans catalysts include, but are not limited to, those discussed in U.S. patent application Ser. No. 10/190,705, filed Jul. 9, 2002, entitled "Low Compression Resilient Golf Balls with Rubber Core," the entire disclosure of which is incorporated by reference herein. For example, the cis-to-trans catalyst component may include one or more cis-to-trans catalysts, but typically includes at least one organosulfur component, a Group VIA component, an inorganic sulfide, or a combination thereof. In one embodiment, the cis-to-trans catalyst includes at least one organosulfur component, wherein the organosulfur component is a halogenated organosulfur compound. Halogenated organosulfur compounds include, but are not limited to those having the following general formula:

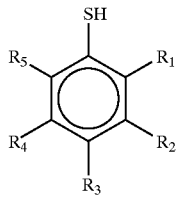

where $R_1$–$R_5$ can be $C_1$–$C_8$ alkyl groups; halogen groups; thiol groups (-SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenol and; and their zinc salts. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif.

Free radical initiators are used to promote cross-linking of the metal salt diacrylate, dimethacrylate, or monomethacrylate and the polybutadiene. Suitable free radical initiators for use in the invention include, but are not limited to, peroxide compounds, such as dicumyl peroxide, 1,1-di(t-butylperoxy)3,3,5-trimethyl cyclohexane, bis(t-butylperoxy) diisopropylbenzene, 2,5-dimethyl-2,5 di (t-butylperoxy)hexane, or di-t-butyl peroxide, and mixtures thereof. Other useful initiators would be readily apparent to one of ordinary skill in the art without any need for experimentation. The initiator(s) at 100 percent activity are preferably added in an amount ranging between about 0.05 pph and about 2.5 pph based upon 100 parts of polybutadiene or polybutadiene-elastomer mixture. In one embodiment, the initiator is present in an amount of about 0.15 pph and about 2 pph. In another embodiment, the initiator is present in an amount of about 0.25 pph and about 1.5 pph.

Typical prior art golf ball cores incorporate about 5 pph to about 50 pph of zinc oxide or calcium oxide in a zinc diacrylate-peroxide cure system that cross-links polybutadiene during the core molding process. In one embodiment of the present invention, the zinc oxide ("ZnO") or calcium oxide ("CaO") in the core composition is used in a sufficient amount to maintain a core compression of less than about 60. For example, the zinc oxide or calcium oxide may be added to the core-forming composition in an amount of about 0.1 pph to about 15 pph, preferably about 1 pph to about 10 pph, most preferably about 1.25 pph to about 5 pph, based on 100 parts polybutadiene or polybutadiene-elastomer mixture.

The core compositions employed in the present invention may also include fillers, added to the elastomeric composition to adjust the density and/or specific gravity of the core. As used herein, the term "fillers" includes any compound or composition that can be used to vary the density and other properties of the subject golf ball cores. Fillers useful in the golf ball core according to the present invention include, for example, zinc oxide, barium sulfate, Polywate, and regrind (recycled core molding matrix ground to 30 mesh particle size). The amount and type of filler utilized is governed by the amount and weight of other ingredients in the composition, since a maximum golf ball weight of 1.620 ounces (45.92 gm) has been established by the USGA. Appropriate fillers generally used range in specific gravity from about 2.0 to 5.6. In the preferred golf ball, the amount of filler in the core is lower than that of a typical golf ball so that the specific gravity of the core is decreased.

Other ingredients such as accelerators, e.g., tetra methylthiuram, processing aids, processing oils, plasticizers, dyes and pigments, antioxidants, as well as other additives well known to the skilled artisan may also be used in the present invention in amounts sufficient to achieve the purpose for which they are typically used.

Intermediate Component(s)

Intermediate layers are sometimes referred to in the art, and, thus, herein as well, as an inner cover layer, as an outer core layer, or as a mantle layer. As with the core, the intermediate layer may also include a plurality of layers. And, an intermediate layer may be included within a ball having, for example, a single layer or multilayer cover, a single layer or multilayer core, both a single layer cover and core, or both a multilayer cover and a multilayer core.

When the golf ball of the present invention includes an intermediate layer, i.e., any layer(s) disposed between the inner core and the outer cover of a golf ball, this layer can include any materials known to those of ordinary skill in the art including thermoplastic and thermosetting materials.

Figure 3:
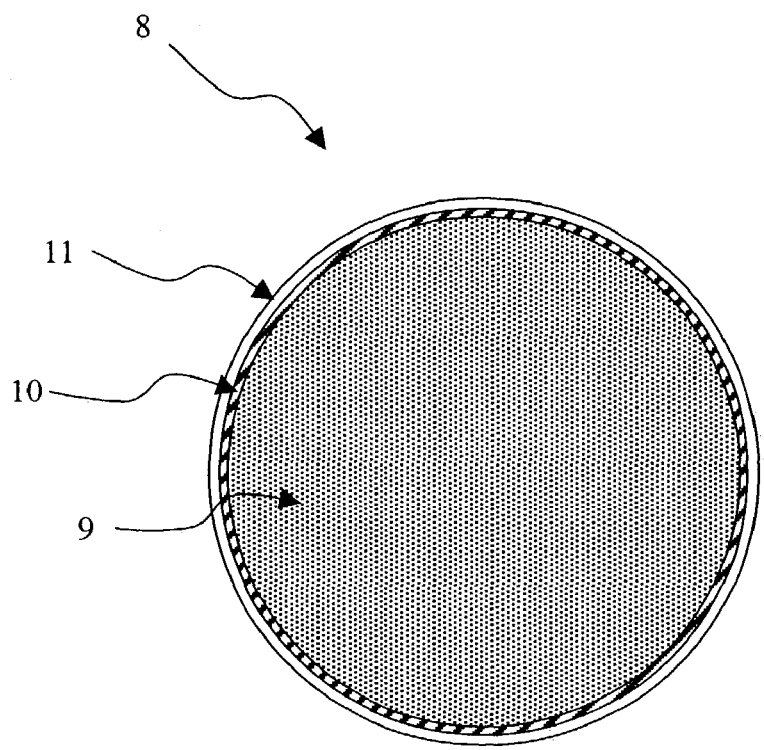
FIG. 3 is a cross-sectional view of a multilayer golf ball including a core, an intermediate layer, and a cover layer disposed thereon according to an embodiment of the present invention.

FIG. 3 illustrates a multilayer golf ball 8, including a cover 11, at least one intermediate layer 10, and a core 9. In one embodiment, the golf ball 8 of FIG. 3 may include a core 9 of polybutadiene reaction material, an intermediate layer 10, and a cover 11 formed of the compositions of the invention, wherein the polyurethane or polyurea composition preferably includes PPDI monomer. The intermediate layer may be formed from any of the polyurethane, polyurea, and polybutadiene materials discussed above. The intermediate layer may also likewise include one or more homopolymeric or copolymeric materials, such as:

1) Vinyl resins, such as those formed by the polymerization of vinyl chloride, or by the copolymerization of vinyl chloride with vinyl acetate, acrylic esters or vinylidene chloride;

2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

3) Polyurethanes, such as those prepared from polyols and diisocyanates or polyisocyanates and those disclosed in U.S. Pat. No. 5,334,673;

4) Polyureas, such as those disclosed in U.S. Pat. No. 5,484,870;

5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

6) Acrylic resins and blends of these resins with poly vinyl chloride, elastomers, and the like;

7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of Philadelphia, Pa.;

8) Polyphenylene oxide resins or blends of polyphenylene oxide with high impact polystyrene as sold under the trademark NORYL by General Electric Company of Pittsfield, Mass.;

9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;

10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and 11) Blends of thermoplastic rubbers with polyethylene, propylene, polyacetal, nylon, polyesters, cellulose esters, and the like.

As used herein, the term "terpolymer" refers to a polymer that is formed from three monomers, wherein said monomers are not identical.

In one embodiment, the intermediate layer includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof.

As briefly mentioned above, ionomer resins, such as ionic copolymers of ethylene and an unsaturated monocarboxylic acid, which are available under the trademark SURLYN® of E. I. DuPont de Nemours & Co., of Wilmington, Del., or IOTEK® or ESCOR® of Exxon. The manner in which ionomeric materials are made is well known in the art and are described in U.S. Pat. No. 3,262,272, which is incorporated by reference herein in its entirety.

Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. In one embodiment, the acid-containing ethylene copolymers for use with the invention are preferably ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers, or mixtures thereof. In another embodiment, the acid-containing ethylene copolymers are preferably ethylene/methacrylic acid, ethylene/acrylic acid, ethylene/(meth) acrylic acid/n-butyl acrylate, ethylene/(meth)acrylic acid/ethyl acrylate, and ethylene/(meth)acrylic acid/methyl acrylate copolymers, or mixtures thereof.

These are copolymers or terpolymers of ethylene and methacrylic acid or acrylic acid totally or partially neutralized, i.e., from about 1 to about 100 percent, with salts of zinc, sodium, lithium, magnesium, potassium, calcium, barium, lead, tin, aluminum, manganese, nickel, or combinations thereof. In one embodiment, the salts are preferably lithium, sodium, zinc, and mixtures thereof.

In one embodiment, the carboxylic acid groups are neutralized from about 10 percent to about 100 percent. In another embodiment, the acid groups are neutralized from about 1 percent to about 90 percent, preferably about 40 percent or greater, and more preferably about 60 percent or greater. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms.

Ionomers may also include E/X/Y copolymers or terpolymers where E is ethylene, X is a softening comonomer such as acrylate or methacrylate present in 0–50 (preferably 0–25) weight percent of the polymer, and Y is acrylic or methacrylic acid present in about 5 percent to about 35 percent by weight of the polymer. In yet another embodiment, Y is present in about 10 percent to about 35 percent by weight of the polymer. In still another embodiment, Y is present in an amount of about 15 percent to about 20 percent of the polymer. In another embodiment, Y is present in an amount from about 8 percent to about 35 percent, preferably about 8 percent to about 25 percent, and more preferably about 8 to about 20 percent, by weight of the polymer.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers.

A low acid ionomer is believed to impart high spin. Thus, in one embodiment, the intermediate layer includes a low acid ionomer where the acid is present in about 10 to 15 weight percent and optionally includes a softening comonomer, e.g., iso- or n-butylacrylate, to produce a softer terpolymer. The softening comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

In another embodiment, the intermediate layer includes at least one high acid ionomer, for low spin rate and maximum distance. In this aspect, the acrylic or methacrylic acid is present in about 15 to about 35 weight percent, making the ionomer a high modulus ionomer. In one embodiment, the high modulus ionomer includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Highly neutralized polymers (HNP), such as ethylene-based ionomers having acid groups neutralized greater than about 70 percent, more preferably greater than about 90 percent, and most preferably at least about 100 percent, may also be used with the present invention. For example, the intermediate layer may be formed from at least one polymer containing $\alpha,\beta$-unsaturated carboxylic acid groups, or the salts thereof, that have been 100 percent neutralized by organic fatty acids. The organic acids may be aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The HNP's may be also be blended with a second polymer component, which, if containing an acid group, may be neutralized in a conventional manner, by organic fatty acids, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

In yet another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. patent application Ser. No. 10/138,304, filed May 6, 2002, entitled "Golf Ball Incorporating Grafted Metallocene Catalyzed Polymer Blends," the entire disclosure of which is incorporated by reference herein. The intermediate layer may also be formed from the compositions as disclosed in U.S. Pat. No. 5,688,191, the entire disclosure of which is incorporated by reference herein.

In still another embodiment, the intermediate layers of the present invention are formed from a blend including up to 100 percent by weight of the polyether-type polyurethane. For example, the intermediate layer may be formed from a blend of about 20 to about 90 percent by weight of a polyether-type polyurethane, about 0 to about 50 percent by weight of the second thermoplastic component (as described above), and about 0 to about 40 percent by weight of a filler such as zinc oxide. In another embodiment, the intermediate layer is formed from a blend of about 30 to 60 percent by weight of a polyether-type polyurethane, 20 to 40 percent by weight of a second thermoplastic component and about 5 to about 40 percent by weight of a filler such as zinc oxide. In yet another embodiment, the intermediate layer is formed from a blend of about 45 to about 50 percent by weight polyether-type polyurethane, about 30 to about 35 percent by weight of a second thermoplastic component and about 17 to about 22 percent by weight of a filler.

The intermediate layer may also be a tensioned elastomeric material wound around a solid, semi-solid, hollow, fluid-filled, or powder-filled center. A wound layer may be described as a core layer or an intermediate layer for the purposes of the invention. As an example, the golf ball 8 of FIG. 3 may include a core layer 9, a tensioned elastomeric layer 10 wound thereon, and a cover layer 11. In particular, the golf ball 8 of FIG. 3 may have a core 9 made of a polybutadiene reaction product, an intermediate layer including a tensioned elastomeric material 10 and cover 11 including the compositions of the invention. The tensioned elastomeric material may be formed of any suitable material known to those of ordinary skill in the art. In yet another embodiment, the golf ball 8 of FIG. 3 may include a wound, liquid center 9, which includes a hollow spherical core shell filled with a liquid, a thread rubber layer including a tensioned elastomeric material 10 and a cover 11 formed from the compositions of the invention.

In one embodiment, the tensioned elastomeric material incorporates the polybutadiene reaction product discussed above. The tensioned elastomeric material may also be formed conventional polyisoprene. In another embodiment, the compositions of the invention are used to form the tensioned elastomeric material. In another embodiment, solvent spun polyether urea, as disclosed in U.S. Pat. No. 6,149,535, which is incorporated in its entirety by reference herein, is used to form the tensioned elastomeric material in an effort to achieve a smaller cross-sectional area with multiple strands.

In one embodiment, the tensioned elastomeric layer is a high tensile filament having a tensile modulus of about 10,000 kpsi or greater, as disclosed in co-pending U.S. patent application Ser. No. 09/842,829, filed Apr. 27, 2001, entitled "All Rubber Golf Ball with Hoop-Stress Layer," the entire disclosure of which is incorporated by reference herein. In another embodiment, the tensioned elastomeric layer is coated with a binding material that will adhere to the core and itself when activated, causing the strands of the tensioned elastomeric layer to swell and increase the cross-sectional area of the layer by at least about 5 percent. An example of such a golf ball construction is provided in co-pending U.S. patent application Ser. No. 09/841,910, the entire disclosure of which is incorporated by reference herein.

The intermediate layer may also be formed of a binding material and an interstitial material distributed in the binding material, wherein the effective material properties of the intermediate layer are uniquely different for applied forces normal to the surface of the ball from applied forces tangential to the surface of the ball. Examples of this type of intermediate layer are disclosed in U.S. patent application Ser. No. 10/028,826, filed Dec. 28, 2001, entitled, "Golf Ball with a Radially Oriented Transversely Isotropic Layer and Manufacture of Same," the entire disclosure of which is incorporated by reference herein. In one embodiment of the present invention, the interstitial material may extend from the intermediate layer into the core. In an alternative embodiment, the interstitial material can also be embedded in the cover, or be in contact with the inner surface of the cover, or be embedded only in the cover.

At least one intermediate layer may also be a moisture barrier layer, as described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a polybutadiene reaction product with fluorine gas. In one embodiment, the moisture barrier layer has a water vapor transmission rate that is sufficiently low to reduce the loss of COR of the golf ball by at least 5 percent if the ball is stored at 100° F. and 70 percent relative humidity for six weeks as compared to the loss in COR of a golf ball that does not include the moisture barrier, has the same type of core and cover, and is stored under substantially identical conditions.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge or plasma treatment prior to forming the cover around it. Other layers of the ball, e.g., the core, also may be surface treated. Examples of these and other surface treatment techniques can be found in U.S. Pat. No. 6,315,915, which is incorporated by reference in its entirety.

Cover Component(s)

Golf ball covers provides the interface between the ball and a club. Properties that are desirable for the cover are good moldability, good impact resistance, high abrasion resistance, high tear strength, high resilience, and good mold release, among others. Thus, depending on the desired properties, the cover may be formed of a single layer or include a plurality of layers, e.g., an inner cover layer disposed about a golf ball center and an outer cover layer formed thereon. For example, FIG. 3 may represent a golf ball 8 having a core 9, a thin inner cover layer 10, and a thin outer cover layer 10 disposed thereon. In particular, the core 9 may be formed of a polybutadiene reaction material, the inner cover layer 10 formed of an ionomer blend, and the outer cover layer 11 formed of the polyurethane or polyurea compositions of the invention.

In one embodiment, at least one cover layer includes about 1 percent to about 100 percent of the compositions of the invention. In another embodiment, at least one cover layer is formed from the composition blends discussed above. For example, in one embodiment, at least one cover layer is formed from a blend of about 10 percent to about 90 percent polyurethane or polyurea and about 90 percent to about 10 percent other polymers and/or other materials. In another embodiment, the cover composition includes from about 10 percent to about 75 percent polyurethane or polyurea and about 90 percent to about 25 percent other polymers and/or other materials.

Figure 4:
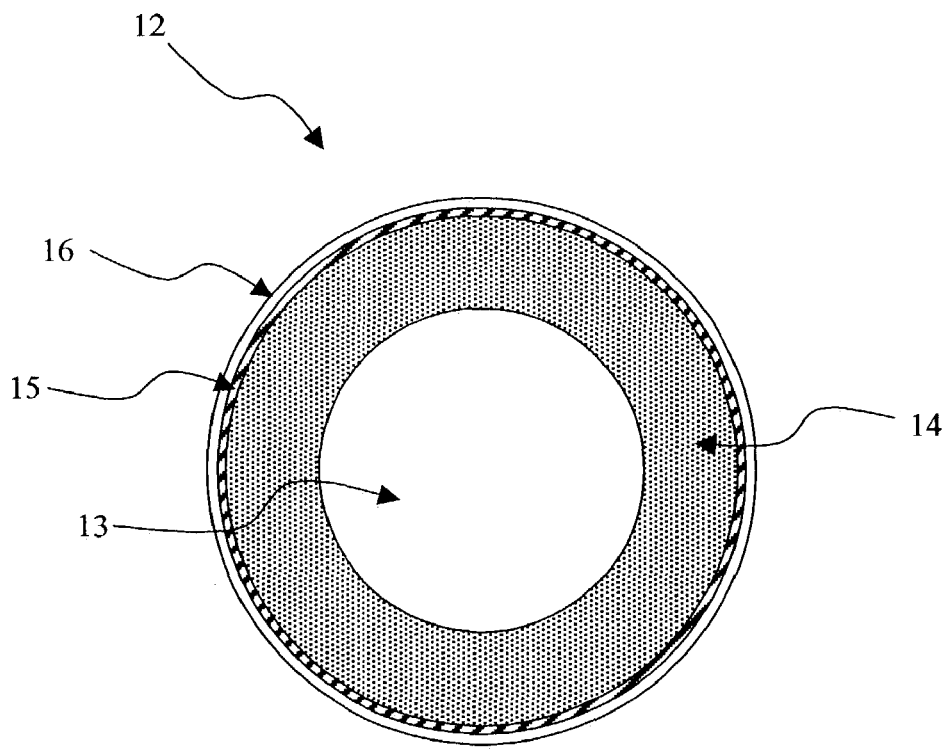
FIG. 4 is a cross-sectional view of a multilayer golf ball including a core, an outer core layer, a thin inner cover layer, and a thin outer cover layer disposed thereon according to an embodiment of the present invention.

In addition, FIG. 4 may represent a golf ball 12 having a core 13, an outer core layer 14, a thin inner cover layer 15, and a thin outer cover layer 16 disposed thereon. In one embodiment, the core 13 and the outer core layer 14 differ in hardness, but are formed of similar polybutadiene reaction materials, the inner cover layer 15 is formed of an ionomer blend, and the outer cover layer 16 is formed of the polyurethane or polyurea compositions of the invention. Furthermore, the compositions of the invention may be used to form a golf ball 5, shown in FIG. 2, having a large core 6 and a thin outer cover layer 7. In one embodiment, the large core 6 is formed of a polybutadiene reaction material and the thin outer cover layer 7 is formed of the polyurethane or polyurea compositions of the invention. In this aspect of the invention, the cover compositions may be acid functionalized, wherein the acid groups are at least partially neutralized.

The present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein. In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. Certain polyurethanes and polyureas may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layer vary by about 3° or greater. In yet another embodiment, the contact angles of the cover layers vary by about 5° or greater.

The cover compositions may also be formed entirely from or include one or more homopolymeric or copolymeric materials in a blend with other materials discussed herein, such as:

1) Vinyl resins, such as those formed by the polymerization of vinyl chloride, or by the copolymerization of vinyl chloride with vinyl acetate, acrylic esters or vinylidene chloride;
2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid, and copolymers and homopolymers produced using a single-site catalyst;
3) Polyurethanes, thermoplastic or thermoset, saturated or unsaturated, aliphatic or aromatic, acid functionalized, such as those prepared from polyols or amines and diisocyanates or polyisocyanates and those disclosed in U.S. Pat. No. 5,334,673 and U.S. patent application Ser. No. 10/072,395;
4) Polyureas, thermoplastic or thermoset, saturated or unsaturated, aliphatic or aromatic, acid functionalized, such as those disclosed in U.S. Pat. No. 5,484,870 and U.S. patent application Ser. No. 10/072,395;
5) Polyamides, such as poly(hexamethylene adipamide) and others prepared from diamines and dibasic acids, as well as those from amino acids such as poly(caprolactam), reinforced polyamides, and blends of polyamides with ionomers, polyethylene, ethylene copolymers, ethyl-propylene-non-conjugated diene terpolymer, and the like;
6) Acrylic resins and blends of these resins with poly vinyl chloride, elastomers, and the like;
7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of Philadelphia, Pa.;
8) Polyphenylene oxide resins or blends of polyphenylene oxide with high impact polystyrene as sold under the trademark NORYL by General Electric Company of Pittsfield, Mass.;
9) Thermoplastic polyesters, such as polyethylene terephthalate, polybutylene terephthalate, polyethylene terephthalate/glycol modified and elastomers sold under the trademarks HYTREL by E. I. DuPont de Nemours & Co. of Wilmington, Del., and LOMOD by General Electric Company of Pittsfield, Mass.;
10) Ethylene, propylene, 1-butene or 1-hexane based homopolymers or copolymers including functional monomers, such as acrylic and methacrylic acid or fully or partially neutralized ionomer resins, and their blends, methyl acrylate, methyl methacrylate homopolymers and copolymers, low acid ionomers, high acid ionomers, and blends thereof;
11) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and
12) Blends of thermoplastic rubbers with polyethylene, propylene, polyacetal, nylon, polyesters, cellulose esters, and the like.

The cover may also be at least partially formed from the polybutadiene reaction product discussed above with respect to the core. In an alternate embodiment, the cover layer is formed of an ionomer resin, such as those described above with respect to intermediate layer materials. For example, the covers of the golf balls of the present invention may be formed from a blend of two or more ionomer resins. Thus, in one embodiment, the cover material is formed from a blend of about 48 percent by weight SURLYN 7940, about 48 percent by weight SURLYN 8940 and about 4 percent by weight of $TiO_2$ color concentrate.

The golf balls of the invention may also be formed with a thermoplastic intermediate layer and a thermoset outer cover layer. For example, in one embodiment, the intermediate layer is formed from thermoplastic PPDI-based polyurethane or polyurea composition and the cover layer is formed from a thermoset composition. The thermoset cover composition may also be PPDI-based polyurethane or polyurea.

In an alternate embodiment, the cover layer is a thermoplastic composition and the intermediate layer is a thermoset composition. For example, the cover layer may be a thermoplastic PPDI-based polyurethane or polyurea composition according to the invention and the intermediate layer may be a thermoset composition.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Methods of Forming

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like.

Conventionally, compression molding and injection molding are applied to thermoplastic materials, whereas RIM, liquid injection molding, and casting are employed on thermoset materials. These and other manufacturing methods are disclosed in U.S. Pat. Nos. 6,207,784 and 5,484,870, the disclosures of which are incorporated herein by reference in their entirety. A method of injection molding using a split vent pin can be found in co-pending U.S. patent application Ser. No. 09/742,435, filed Dec. 22, 2000, entitled "Split Vent Pin for Injection Molding." Examples of retractable pin injection molding may be found in U.S. Pat. Nos. 6,129,881, 6,235,230, and 6,379,138. These molding references are incorporated in their entirety by reference herein. In addition, a chilled chamber, i.e., a cooling jacket, such as the one disclosed in U.S. patent application Ser. No. 09/717,136, filed Nov. 22, 2000, entitled "Method of Making Golf Balls" may be used to cool the compositions of the invention when casting, which also allows for a higher loading of catalyst into the system.

The cores of the invention may be formed by any suitable method known to those of ordinary skill in art. When the cores are formed from a thermoset material, compression molded is a particularly suitable method of forming the core, as set forth in U.S. Pat. No. 4,389,365, which is incorporated by reference herein in its entirety. In a thermoplastic core embodiment, on the other hand, the cores may be injection molded.

For example, methods of converting the cis-isomer of the polybutadiene resilient polymer core component to the trans-isomer during a molding cycle are known to those of ordinary skill in the art. Suitable methods include single pass mixing (ingredients are added sequentially), multi-pass mixing, and the like. The crosslinking agent, and any other optional additives used to modify the characteristics of the golf ball center or additional layer(s), may similarly be combined by any type of mixing. Suitable mixing equipment is well known to those of ordinary skill in the art, and such equipment may include a Banbury mixer, a two-roll mill, or a twin screw extruder. Suitable mixing speeds and temperatures are well-known to those of ordinary skill in the art, or may be readily determined without undue experimentation.

The mixture can be subjected to, e.g., a compression or injection molding process, and the molding cycle may have a single step of molding the mixture at a single temperature for a fixed-time duration. In one embodiment, a single-step cure cycle is employed. Although the curing time depends on the various materials selected, a suitable curing time is about 5 to about 18 minutes, preferably from about 8 to about 15 minutes, and more preferably from about 10 to about 12 minutes. An example of a single step molding cycle, for a mixture that contains dicumyl peroxide, would hold the polymer mixture at 171° C. (340° F.) for a duration of 15 minutes. An example of a two-step molding cycle would be holding the mold at 143° C. (290° F.) for 40 minutes, then ramping the mold to 171° C. (340° F.) where it is held for a duration of 20 minutes. Those of ordinary skill in the art will be readily able to adjust the curing time based on the particular materials used and the discussion herein.

Furthermore, U.S. Pat. Nos. 6,180,040 and 6,180,722 disclose methods of preparing dual core golf balls. The disclosures of these patents are hereby incorporated by reference in their entirety.

The intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like. It is important that the intermediate layer material be able to sustain the temperatures applied during the application of the cover layer. When the intermediate layer is injection molded about the core, the injection molding preferably occurs at a temperature below 400° F.

The compositions of the invention may be applied over an inner ball using a variety of application techniques such as spraying, compression molding, injection molding, RIM, LIM, casting, dipping, spin coating, or flow coating methods that are well known in the art. In one embodiment, the compositions of the invention are used to form a cover over the core using a combination of casting and compression molding.

U.S. Pat. Nos. 5,733,428 and 5,888,437, the entire disclosures of which are hereby incorporated by reference, both disclose useful methods for forming polyurethane covers on golf ball core. Because these methods relates to the use of casting thermoset and thermoplastic materials as the golf ball cover, the polyurea compositions of the invention may also be formed about an inner ball using the methods described in U.S. Pat. Nos. 5,733,428 and 5,888,437.

For example, once a thermoset composition of the invention is mixed, an exothermic reaction commences and continues until the material is solidified around the core. It is important that the viscosity be measured over time, so that the subsequent steps of filling each mold half, introducing the core into one half and closing the mold can be properly timed for accomplishing centering of the core cover halves fusion and achieving overall uniformity. A suitable viscosity range of the curing mix for introducing cores into the mold halves is determined to be approximately between about 2,000 cP and about 30,000 cP, with the preferred range of about 8,000 cP to about 15,000 cP.

To start the cover formation in a thermoset embodiment, mixing of the prepolymer and curative is accomplished in a motorized mixer inside a mixing head by feeding through lines metered amounts of curative and prepolymer. Top preheated mold halves are filled and placed in fixture units using centering pins moving into apertures in each mold. At a later time, the cavity of a bottom mold half, or the cavities of a series of bottom mold halves, is filled with similar mixture amounts as used for the top mold halves. After the reacting materials have resided in top mold halves for about 40 to about 100 seconds, preferably for about 60 to about 80 seconds, and more preferably for about 70 to about 80 seconds, a core is lowered at a controlled speed into the gelling reacting mixture.

A ball cup holds the ball core through reduced pressure (or partial vacuum). Upon location of the core in the halves of the mold after gelling for about 4 to about 12 seconds, the vacuum is released allowing the core to be released. In one embodiment, the vacuum is released allowing the core to be released after about 5 seconds to 10 seconds. The mold halves, with core and solidified cover half thereon, are removed from the centering fixture unit, inverted and mated with second mold halves which, at an appropriate time earlier, have had a selected quantity of reacting prepolymer and curing agent introduced therein to commence gelling.

Similarly, U.S. Pat. No. 5,006,297 and U.S. Pat. No. 5,334,673 both also disclose suitable molding techniques that may be utilized to apply the castable reactive liquids employed in the present invention. However, the method of the invention is not limited to the use of these techniques; other methods known to those skilled in the art may also be employed. For instance, other methods for holding the ball core may be utilized instead of using a partial vacuum.

Dimples

The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, which is incorporated herein in its entirety. Dimple patterns may also be based on Archimedean patterns including a truncated octahedron, a great rhombcuboctahedron, a truncated dodecahedron, and a great rhombicosidodecahedron, wherein the pattern has a non-linear parting line, as disclosed in U.S. patent application Ser. No. 10/078,417, which is incorporated by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193, the entire disclosures of which are incorporated by reference herein, disclose geometric patterns for positioning dimples on a golf ball. In one embodiment, the dimple coverage is greater than about 60 percent, preferably greater than about 65 percent, and more preferably greater than about 75 percent.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein.

In an alternative embodiment, the golf ball may have a non-planar parting line allowing for some of the plurality of pyramidal projections to be disposed about the equator. Such a golf ball may be fabricated using a mold as disclosed in co-pending U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections.

In addition, catenary curve dimple profiles, as disclosed in U.S. patent application Ser. No. 09/989,191, filed Nov. 21, 2001, entitled "Golf Ball Dimples with a Catenary Curve Profile," which is incorporated in its entirety by reference herein, are contemplated for use with the golf balls of the present invention.

Finally, several additional non-limiting examples of dimple patterns with varying sizes of dimples are also provided in U.S. Pat. Nos. 6,351,161 and 6,213,898, the entire disclosures of which are incorporated by reference herein.

Golf Ball Post-Processing

The golf balls of the present invention may be painted, coated, or surface treated for further benefits. For example, golf balls covers frequently contain a fluorescent material and/or a dye or pigment to achieve the desired color characteristics. In one embodiment, a derivative of 7-triazinylamino-3-phenylcoumarin is contemplated for use as the fluorescent whitening agent to provide improved weather resistance and brightness, as disclosed in U.S. Patent Publication No. 2002/0082358, which is incorporated herein in its entirety. In one embodiment, the coating layer(s) is applied to the golf ball cover by an in-mold coating process, such as described in U.S. Pat. No. 5,849,168, which is incorporated in its entirety by reference herein.

In addition, trademarks or other indicia may be applied to the ball components, such as described in U.S. patent application Ser. No. 10/012,538, filed Dec. 12, 2001, entitled, "Method of Forming Indicia on a Golf Ball," U.S. Pat. No. 5,248,878, U.S. Pat. No. 6,075,223, and U.S. Pat. No. 6,462,303, the entire disclosures of which are incorporated by reference herein.

Golf Ball Properties

Golf ball properties such as hardness, modulus, core diameter, intermediate layer thickness and cover layer thickness have been found to affect play characteristics such as spin, initial velocity and feel of the present invention golf balls. For example, the flexural and/or tensile modulus of the intermediate layer are believed to have an effect on the "feel" of the golf balls of the present invention.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions. It should be understood that this invention contemplates intermixing the ranges provided herein, e.g., the high end of one range may be mixed with the low end of another range.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

In still another embodiment, the cores employed in the golf balls of the present invention have a diameter of about 1.25 inches to about 1.60 inches. In this aspect of the invention, when incorporating a cover and an intermediate layer, the core diameter is preferably about 1.30 inches to about 1.48 inches. For example, the core may have a diameter of about 1.39 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes an inner core layer and an outer core layer, the inner core layer is preferably about 0.9 inches or greater and the outer core layer preferably has a thickness of about 0.1 inches or greater. In one embodiment, the inner core layer has a diameter from about 0.09 inches to about 1.2 inches and the outer core layer has a thickness from about 0.1 inches to about 0.8 inches. In yet another embodiment, the inner core layer diameter is from about 0.095 inches to about 1.1 inches and the outer core layer has a thickness of about 0.20 inches to about 0.03 inches.

The cover typically has a thickness to provide sufficient strength, good performance characteristics, and durability. The cover preferably has a thickness of about 0.02 inches to about 0.12 inches, preferably about 0.1 inches or less. When the compositions of the invention are used to form the outer cover of a golf ball, the cover may have a thickness of about 0.1 inches or less, preferably about 0.07 inches or less. In one embodiment, the cover layer is about 0.01 inches or greater. In another embodiment, the outer cover has a thickness from about 0.02 inches to about 0.07 inches. And, in another embodiment, the cover thickness is about 0.05 inches or less, preferably from about 0.02 inches to about 0.05 inches. In yet another embodiment, the outer cover layer of such a golf ball is between about 0.02 inches and about 0.045 inches. In still another embodiment, the outer cover layer is about 0.025 to about 0.04 inches thick and, in another, about 0.02 inches to about 0.35 inches. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. In one embodiment, the thickness of the intermediate layer is from about 0.002 inches to about 0.1 inches, preferably about 0.01 inches or greater. For example, the intermediate layer may be about 0.01 inches to about 0.10 inches thick, preferably about 0.02 inches to about 0.12 inches thick.

In one embodiment, the thickness of the intermediate layer is about 0.09 inches or less, more preferably about 0.03 inches to about 0.08 inches. For example, the intermediate layer may be about 0.06 inches thick or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball The outer diameter of the intermediate layer is preferably about 1.5 to about 1.65 inches. In one embodiment, the outer diameter is about 1.5 inches to about 1.6 inches. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

The overall diameter of the core and the intermediate layer is preferably about 85 percent to about 97 percent of the overall diameter of the finished ball.

Hardness

Most golf balls consist of layers having different hardnesses, e.g. hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 (Shore C and D hardnesses) and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques: are not linearly related and, therefore, one hardness value cannot easily be correlated to the other.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. In still another embodiment, the core has a hardness about 30 to about 65 Shore D, and more preferably, the core has a hardness about 35 to about 60 Shore D. Preferably, the core has a Shore D hardness of about 35 to 45 and preferably within 10 Shore D of the Shore D hardness of the intermediate layer.

The core hardness may also be defined in terms of Shore C. Thus, in one embodiment, the core has a hardness of about 65 Shore C to about 80 Shore C, more preferably about 65 Shore C to about 75 Shore C.

When a polybutadiene reaction product is incorporated into a core, the core may have a hardness gradient, i.e., a first hardness at a first point, e.g., at an interior location, and a second hardness at a second point, e.g., at an exterior surface, as measured on a molded sphere. In one embodiment, the second hardness is at least about 6 percent greater than the first hardness, preferably about 10 percent greater than the first hardness. In other embodiments, the second hardness is at least about 20 percent greater or at least about 30 percent greater, than the first hardness.

For example, the interior of the core may have a first hardness of about 45 Shore C to about 60 Shore C and the exterior surface of the core may have a second hardness of about 65 Shore C to about 75 Shore C. In one golf ball formulated according to the invention, the first hardness was about 51 Shore C and a second hardness was about 71 Shore C, providing a hardness difference of greater than 20 percent.

In one embodiment, however, the core has a substantially uniform hardness throughout. Thus, in this aspect, the first and second hardness preferably differ by about 5 percent or less, more preferably about 3 percent or less, and even more preferably by about 2 percent or less. In another embodiment, the hardness is uniform throughout the component.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater. When the intermediate layer is a thin inner cover layer, the inner cover layer preferably has a material hardness from about 50 to about 75 Shore D, preferably from about 60 to about 65 Shore D.

In another embodiment, the intermediate layer has a hardness of about 20 Shore D to 40 Shore D, and more preferably about 27 Shore D to about 33 Shore D. In still another embodiment, the intermediate layer has a hardness of about 40 Shore C to about 60 Shore C, preferably from about 50 Shore D to about 60 Shore D.

When the intermediate layer is intended to be harder than the core layer, the ratio of the intermediate layer hardness to the core hardness is preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 60 Shore D, preferably about 35 Shore D to about 55 Shore D. In one embodiment, the cover has a hardness of about 40 Shore D to about 65 Shore D. In another embodiment, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In this embodiment when the outer cover layer is softer than the intermediate layer or inner cover layer, the ratio of the Shore D hardness of the outer cover material to the intermediate layer material is about 0.8 or less, preferably about 0.75 or less, and more preferably about 0.7 or less. In another embodiment, the ratio is about 0.5 or less, preferably about 0.45 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

The cover hardness may also be defined in terms of Shore C. For example, the cover may have a hardness of about 70 Shore C or greater, preferably about 80 Shore C or greater. In another embodiment, the cover has a hardness of about 95 Shore C or less, preferably about 90 Shore C or less.

In another embodiment, the cover layer is harder than the intermediate layer. In this design, the ratio of Shore D hardness of the cover layer to the intermediate layer is about 1.33 or less, preferably from about 1.14 or less. In this aspect of the invention, the cover layers employed in the present invention may have a Shore D hardness of about 54 to about 72, more preferably about 65 to about 70, and most preferably about 68 to about 70.

When a two-piece ball is constructed, the core may be softer than the outer cover. For example, the core hardness may range from about 30 Shore D to about 50 Shore D, and the cover hardness may be from about 50 Shore D to about 80 Shore D. In this type of construction, the ratio between the cover hardness and the core hardness is preferably about 1.75 or less. In another embodiment, the ratio is about 1.55 or less. Depending on the materials, for example, if a composition of the invention is acid-functionalized wherein the acid groups are at least partially neutralized, the hardness ratio of the cover to core is preferably about 1.25 or less.

Compression

Compression values are dependent on the diameter of the component being measured. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J. Atti compression is typically used to measure the compression of a golf ball.

Many conventional two-piece "distance" golf balls are formed with cores having a high compression (e.g., greater than about 90) in order to achieve the desired high finished ball COR and initial velocity necessary to obtain long overall distance for the ball. Balls having such high compression cores typically have a hard feel when struck with a golf club. In this aspect of the invention, i.e., a hard core ball, the core compression may be about 90 or greater. For example, the compression of the hard core may range from about 90 to about 100.

However, the two-piece and multilayer golf balls of the present invention may also be formed with a core having a relatively lower compression, but still exhibit a finished ball COR and initial velocity approaching that of conventional two-piece distance balls due to the overall ball construction. In one embodiment, the Atti compression of the core, or portion of the core, of golf balls prepared according to the invention is less than about 80, more preferably less than about 75. In another embodiment, the core compression is from about 40 to about 80, preferably from about 50 to about 70. In yet another embodiment, the cores employed in the golf balls of the present invention have a compression of less than about 60, more preferably about 45 to about 60 and most preferably about 50 to 55. In still another embodiment, the core compression is preferably below about 50, and more preferably below about 25.

In another low compression embodiment, the core has a compression less than about 20, more preferably less than about 10, and most preferably, 0. As known to those of ordinary skill in the art, however, the cores generated according to the present invention may be below the measurement of the Atti Compression Gauge.

The core of the present invention may also have a Soft Center Deflection Index (SCDI) compression of less than about 160, more preferably, between about 40 and about 160, and most preferably, between about 60 and about 120.

In one embodiment, golf balls of the invention preferably have an Atti compression of about 55 or greater, preferably from about 60 to about 120. In another embodiment, the Atti compression of the golf balls of the invention is at least about 40, preferably from about 50 to 120, and more preferably from about 60 to 100. In yet another embodiment, the compression of the golf balls of the invention is about 75 or greater and about 95 or less. For example, a preferred golf ball of the invention may have a compression from about 80 to about 95. In another embodiment, the golf balls of the present invention have an overall maximum compression of about 90, more preferably about 75 to about 85.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range.

As a result, of the initial velocity limitation set forth by the USGA, the goal is to maximize COR without violating the 255 ft/s limit. As used herein, "COR" refers to Coefficient of Restitution, which is obtained by dividing a ball's rebound velocity by its initial, i.e., incoming, velocity. A golf ball having a high COR dissipates a smaller fraction of its total energy when colliding with the plate and rebounding therefrom than does a ball with a lower COR. The COR values reported herein, are obtained by firing the object at a steel plate at an incoming velocity of 125 ft/sec and measuring the outgoing velocity and determining the percentage of the outgoing velocity relative to the incoming velocity.

In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.7 to about 0.85. In one embodiment, the COR is about 0.75 or greater, preferably about 0.76 or greater, more preferably about 0.78 or greater, and even more preferably about 0.79 or greater. In another embodiment, the ball has a COR of about 0.8 or greater.

In addition, the inner ball preferably has a COR of about 0.780 or more. In one embodiment, the COR of the inner ball is about 0.790 or greater.

Flexural Modulus

Accordingly, it is preferable that the golf balls of the present invention have an intermediate layer with a flexural modulus of about 500 psi to about 500,000 psi (as measured by ASTM D-790). More preferably, the flexural modulus of the intermediate layer is about 1,000 psi to about 250,000 psi. In one embodiment, the flexural modulus of the intermediate layer is about 80,000 or less. Most preferably, the flexural modulus of the intermediate layer is about 2,000 psi to about 200,000 psi. In one embodiment, the intermediate layer has a flexural modulus of less than about 10,000 psi, more preferably about 2,000 to about 8,000 psi.

In one embodiment, the flexural modulus of the cover is about 500 psi to about 150,000 psi, preferably about 2,000 psi or greater, and more preferably about 5,000 psi or greater. In another embodiment, the flexural modulus of the cover is from about 10,000 psi to about 150,000 psi. More preferably, the flexural modulus of the cover layer is about 15,000 psi to about 120,000 psi. Most preferably, the flexural modulus of the cover layer is about 18,000 psi to about 110,000 psi. In yet another embodiment, the flexural moduli of the cover layer is about 100,000 psi or less, preferably about 80,000 or less, and more preferably about 70,000 psi or less. In one embodiment, when the cover layer has a hardness of about 50 Shore D to about 60 Shore D, the cover layer preferably has a flexural modulus of about 55,000 psi to about 65,000 psi. In still another embodiment, the flexural modulus of the cover layer is about 1,000 psi to about 30,000 psi.

In one embodiment, the ratio of the flexural modulus of the intermediate layer to the cover layer is about 0.003 to about 50. In another embodiment, the ratio of the flexural modulus of the intermediate layer to the cover layer is about 0.006 to about 4.5. In yet another embodiment, the ratio of the flexural modulus of the intermediate layer to the cover layer is about 0.11 to about 4.5.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Spin Rate

As known to those of ordinary skill in the art, the spin rate of a golf ball will vary depending on the golf ball construction. In a multilayer ball, e.g., a core, an intermediate layer, and a cover, wherein the cover is formed from the polyurea or polyurethane compositions of the invention, the spin rate of the ball off a driver ("driver spin rate") may be about 2000 rpm or greater. In one embodiment, the driver spin rate is about 2000 rpm to about 3500 rpm. In another embodiment, the driver spin rate is about 2200 rpm to about 3400 rpm. In still another embodiment, the driver spin rate may be less than about 2700 rpm.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Specific Gravity

Specific gravity is measured using ASTM D-297, which is carried out in lab conditions where the temperature was controlled to 20–23° C. The specific gravity of a particular golf ball component depends on the size of the component. In one embodiment, the specific gravity of a cover or intermediate layer is preferably at least about 0.7. In another embodiment, the intermediate layer has a specific gravity of about 1 or less. In yet another embodiment, the specific gravity of the intermediate layer or cover is about 0.8 or greater, preferably about 0.9 or greater. For example, the golf ball may have an intermediate layer with a specific gravity of about 0.9 or greater and a cover having a specific gravity of about 0.95 or greater.

In an alternate embodiment, the intermediate layer has a relatively higher specific gravity, i.e., greater than about 1.2, preferably about 1.21 to about 1.30, more preferably about 1.23 to about 1.29. In this aspect of the invention, an intermediate layer may have a specific gravity of about 1.27. The desired specific gravity of the intermediate layer may be obtained by adding fillers to the intermediate layer composition as described above, such as barium sulfate, zinc oxide, titanium dioxide and combinations thereof. For example, zinc oxide may be added to the intermediate layer composition to achieve a specific gravity of about 1.27.

In another embodiment, the golf ball has a core with a specific gravity of about 1.10 or greater and a cover with a specific gravity of about 0.95 or greater. In yet another embodiment, the core of the present invention has a specific gravity of about 1.0 to about 1.2, preferably in the range of about 1.1 to about 1.18

Percent Rebound Resilience

As used herein the percent rebound resilience is the measure of the rebound height of a plunger using the rebound apparatus according to ASTM-2632-92. In one embodiment, the percent rebound resilience of the compositions of the invention is about 40 percent or greater, preferably about 60 percent or greater. In another embodiment, the compositions of the invention have a percent rebound resilience o about 65 percent or greater. In still another embodiment, the percent rebound resilience of the compositions of the present invention is about 70 percent or greater.

Water Resistance

The water resistance of a golf ball portion formed from the compositions of the invention may be expressed in terms of weight gain over a period of time. For example, weight changes of a golf ball portion monitored over a period of seven weeks in 100 percent relative humidity and 72° F. help to demonstrate which balls have better water resistance. In one embodiment, the golf ball portions of the invention have a weight gain of about 0.15 grams or less after seven weeks. In another embodiment, the golf balls of the invention have a weight gain of about 0.13 grams or less after a seven-week storage period. In still another embodiment, the weight gain of the golf balls of the invention is about 0.09 grams or less after seven weeks. In yet another embodiment, the weight gain is about 0.06 grams or less after a seven-week period. The golf balls of the invention preferably have a weight gain of about 0.03 grams or less over a seven-week storage period.

Size gain may also be used as an indicator of water resistance. That is, the more water a golf ball takes on, the larger a golf ball becomes due to the water enclosed beneath the outermost layer of the golf ball portion. Thus, the golf balls of the invention preferably have no appreciable size gain. In one embodiment, the size gain of the golf balls of the invention after a seven-week period is about 0.001 inches or less.

Adhesion Strength

The adhesion, or peel, strength of the compositions of the invention is preferably about 5 $lb_f$/in or greater. In one embodiment, the adhesion strength is about 25 $lb_f$/in or less. For example, the adhesion strength is preferably about 10 $lb_f$/in or more and about 20 $lb_f$/in or less. In another embodiment, the adhesion strength is about 20 $lb_f$/in or greater, preferably about 24 $lb_f$/in or greater. In yet another embodiment, the adhesion strength is about 26 $lb_f$/in or greater. In still another embodiment, the adhesion strength is about 20 $lb_f$/in to about 30 $lb_f$/in.

Shear/Cut Resistance

The cut resistance of a golf ball cover may be determined using a shear test having a scale from 1 to 9 assessing damage and appearance. In one embodiment, the damage rank is preferably about 3 or less, more preferably about 2 or less. In another embodiment, the damage rank is about 1 or less. The appearance rank of a golf ball of the invention is preferably about 3 or less. In one embodiment, the appearance rank is about 2 or less, preferably about 1 or less.

Light Stability

As discussed above, the compositions of the invention may be inherently light stable, i.e., include no aromatic components. The light stability of the cover may be quantified by the difference in yellowness index (*YI), i.e., yellowness measured after a predetermined exposure time—yellowness before exposure. In one embodiment, the *YI is about 10 or less after 5 days (120 hours) of exposure, preferably about 6 or less after 5 days of exposure, and more preferably about 4 or less after 5 days of exposure. In one embodiment, the *YI is about 2 or less after 5 days of exposure, and more preferably about 1 or less after 5 days of exposure.

The difference in the b chroma dimension (*b*, yellow to blue) is also a way to quantify the light stability of the cover. In one embodiment, the b is about 4 or less after 5 days (120 hours) of exposure, preferably about 3 or less after 5 days of exposure, and more preferably about 2 or less after 5 days of exposure. In one embodiment, the b is about 1 or less after 5 days of exposure.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

The cores of multilayer balls were formed by compression molding a blend of the batch formulation set forth in Table 1 below.

TABLE 1

Core Batch Formulation

| Material | Parts Per Hundred |
| --- | --- |
| Polybutadiene (Cariflex 1220) | 76.0 |
| Rubber (Neocis BR-40) | 24.0 |
| Pigment | 0.03 |
| Zinc Diacrylate | 25.3 |
| Zinc Oxide | 2.1 |
| Regrind | 6.5 |
| Peroxide (Varox 231 XL) | 0.43 |
| Peroxide (Elastochem DBDB EF-60) | 0.16 |
| Density Adjusting Filler | 22.6 |

All of the cores had a diameter of about 1.39 inches and were measured to have compressions ranging from about 47 to 53 and specific gravities of about 1.138 to 1.156. For the above core batch formulation, the resultant cores were measured to have a compression of 50. The intermediate layer blends of Table 2 were subsequently injection molded about the cores of Table 1 at a temperature of about 375° F. to form the intermediate layers of the balls having an outer diameter of about 1.51 inches.

TABLE 2

Intermediate Layer Formulation

| Formulation | Example 1 (weight percent) | Example 2 (weight percent) |
| --- | --- | --- |
| Hytrel 3078[1] | 32 | — |
| Hytrel 4069[1] | — | 32 |
| Zinc oxide | 20 | 20 |
| ESTANE 5740 × 820 | 48 | 48 |

[1]Block copoly(ether-ester) elastomer, from DuPont.

All of the multilayer balls had a cover composition formed by compression molding a blend of about 50 percent SURLYN 7940 and about 50 percent SURLYN 8940 with a sufficient amount of titanium dioxide concentrate about the intermediate layers and were subsequently finished using conventional clear coating and buffing techniques. The finished golf balls had an outer diameter of just greater than 1.68 inches. These balls were tested for initial velocity, compression, cover hardness, and COR, the results of such tests are set forth in Table 3 below.

As can be seen in Table 3, both mantle layers and golf balls prepared according to the present invention, shown as the compositions presented in Examples 1–3 in Table 2 above, exhibit low compression, i.e., soft "feel", while retaining high initial velocity or COR.

TABLE 3

Mantle Layer and Ball Properties

|  | Example 1 | Example 2 |
| --- | --- | --- |
| Mantle Properties |  |  |
| Hardness[1] | 30 | 30 |
| Compression | 49 | 52 |
| COR[2] | 0.763 | 0.762 |

TABLE 3-continued

Mantle Layer and Ball Properties

|  | Example 1 | Example 2 |
| --- | --- | --- |
| Ball Properties |  |  |
| Cover Hardness[1] | 67 | 67 |
| Compression | 80 | 81 |
| COR[2] | 0.794 | 0.793 |

[1]Shore D hardness
[2]Adjusted COR at 125 ft/s incoming velocity

Example 2

Golf Ball Produced with a Diol Curing Agent

Two identically constructed golf balls were prepared, each with a liquid-filled center, a wound layer, and a cover. The first golf ball control formulation had a cover formed of a control formulation employing conventional polyurethane composition technology. In the second golf ball experimental formulation, the cover layer was formed with the thermoplastic polyurethane composition of the present invention, including a reaction product of 4,4'-diphenylmethane diisocyanate, polytetramethylene ether glycol, and mixtures of 1,3-bis-(2-hydroxyethoxy)benzene and 1,3-[bis-(2-hydroxyethoxy)]-diethoxy benzene. A color dispersion was added to both formulations. The golf ball products were processed according to methods described in the U.S. Pat. Nos. 5,733,428 and 5,888,437. The formulations of both golf balls are set forth in Table 4 below.

TABLE 4

Formulations

| Materials | Control | Invention |
| --- | --- | --- |
| MDI-PTMEG Prepolymer[1] | 1 eq. | 1 eq. |
| HER-TG 250[2] | — | 0.95 eq. |
| VERSALINK ® P-250[3] | 0.95 eq. | — |
| Color Dispersion | 3.5 percent | 3.5 percent |

[1]MDI present in an about 9% and PTMEG present in about 91%
[2]Mixture of 1,3-bis-(2-hydroxyethoxy) benzene and 1,3-[bis-(2-hydroxyethoxy)]-diethoxy benzene, manufactured by Indspec Chemical Corporation
[3]An oligomeric diamine manufactured by Air Products and Chemicals, Inc.

As can be seen in Table 5 below, the golf ball prepared according to the present invention Experimental Formulation had a 3.5 ft/s gain in initial velocity compared to the control golf ball. An increase of 3.5 ft/s in the golf ball initial velocity, as is well known to those of ordinary skill in the art, is a significant increase. In efforts to achieve initial velocity values as close as possible to the maximum limit of 255 ft/s, set by the USGA, the increase demonstrated above is extremely beneficial. Additionally, the golf ball prepared according to the present invention exhibited a significantly lower compression i.e., better "feel" yet retained the same hardness as the golf ball made with a control formulation. As is also recognized by those of ordinary skill in the art, a lower golf ball compression will result in lower driver spin, allowing the golf ball to more closely match ideal launch conditions for maximum distance.

TABLE 5

Golf Ball Properties

| Physical Properties | Control | Invention |
|---|---|---|
| Size, in: nameplate | 1.682 | 1.688 |
| Size, in: equator | 1.681 | 1.684 |
| Weight, oz | 1.600 | 1.599 |
| Compression, Atti | 93 | 86 |
| Cover Hardness, Shore D | 58 | 58 |
| Ball Initial Velocity, ft/s | 249.4 | 252.9 |

Example 3

Golf Ball Prepared with a Secondary Diamine Curing Agent

Two identically constructed golf balls were prepared, each with a liquid-filled center, a wound layer, and a cover. The first golf ball control formulation had a cover formed of a control formulation employing conventional polyurethane composition technology. In the second golf ball experimental formulation, the cover layer was formed with the thermoplastic polyurethane composition of the present invention, including a reaction product of 4,4'-dicyclohexylmethane diisocyanate, polytetramethylene ether glycol and 4,4'-bis-(sec-butylamino)-dicyclohexylmethane. A color dispersion was added to both formulations. The golf ball products were processed according to methods described in the U.S. Pat. Nos. 5,733, 428 and 5,888,437. The formulations of both golf balls are set forth in Table 6 below.

TABLE 6

Formulations

| Materials | Control | Invention |
|---|---|---|
| MDI-PTMEG Prepolymer[1] | 1 eq. | — |
| $H_{12}$MDI-PTMEG/polycaprolactone Prepolymer[2] | — | 1 eq. |
| CLEARLINK 1000[3] | — | 0.95 eq. |
| VERSALINK ® P-250[4] | 0.95 eq. | — |
| Color Dispersion | 3.5 percent | 3.5 percent |

[1]MDI present in an about 8 percent and PTMEG present in about 92%
[2]$H_{12}$MDI present in about 8 percent and PTMEG/polycaprolactone present in about 92 percent
[3]An aliphatic secondary diamine manufactured by UOP, LLC
[4]An oligomeric diamine manufactured by Air Products and Chemicals, Inc.

The golf ball properties, for both the conventional golf ball and the golf ball produced according to the invention, are set forth in Table 7 below:

TABLE 7

Golf Ball Properties

| Physical Properties | Control | Invention |
|---|---|---|
| Size, in: nameplate | 1.684 | 1.691 |
| Size, in: equator | 1.684 | 1.687 |
| Weight, oz | 1.592 | 1.571 |
| Compression, Atti | 88 | 91 |
| Cover Hardness, Shore D | 56 | 59 |
| COR | 0.788 | 0.788 |

While it is apparent that the illustrative embodiments of the invention herein disclosed fulfill the objectives stated above, it will be appreciated that numerous modifications and other embodiments may be devised by those skilled in the art. For example, as briefly discussed herein, the compositions of the invention may include additives, such as pigments, foaming agents, inert/reactive fillers, including ceramic spheres, glass spheres, and the like, as would be readily determined by one of ordinary skill in the art. In addition, the compositions of the present invention may be used for other golf equipment. For example, golf club face and back cavity inserts, like those disclosed in U.S. Pat. Nos. 5,316,298 and 5,575,472, which are also incorporated in their entirety by reference herein, may be formed, at least in part, with the compositions of the present invention. Therefore, it will be understood that the appended claims are intended to cover all such embodiments that come within the spirit and scope of the present invention.

What is claimed is:

1. A golf ball comprising:
   a core;
   a layer disposed about the core having a hardness of about 30 Shore D or greater, a flexural modulus of about 1,000 psi to about 80,000 psi, and a thickness of about 0.01 inches to about 0.100 inches, wherein the layer is formed from a thermoplastic composition comprising p-phenylene diisocyanate and at least one hydroxy-terminated curing agent selected from the group consisting of poly(phthalate carbonate)glycol, poly(hexamethylene carbonate)glycol, polycarbonate polyols containing bisphenol A, and mixtures thereof; and
   a cover having a hardness of about 20 Shore D or greater, a flexural modulus of about 1,000 psi to about 30,000 psi, and a thickness of about 0.01 inches to about 0.05 inches, wherein the cover is formed from a thermoset material.

2. The golf ball of claim 1, wherein the core comprises a center and an outer core layer, and wherein the center has a diameter of about 0.5 inches to about 1.3 inches.

3. The golf ball of claim 1, wherein the thermoplastic composition further comprises a hydroxy-terminated curing agent selected from the group consisting of polyethylene propylene glycol, polytetramethylene ether glycol, polyoxypropylene glycol, ethylene oxide capped poly(oxypropylene)glycol, and mixtures thereof.

4. The golf ball of claim 1, wherein the thermoplastic composition further comprises a hydroxy-terminated curing agent selected from the group consisting of 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, polytetramethylene ether glycol initiated polycaprolactone, and mixtures thereof.

5. The golf ball of claim 1, wherein the thermoset material comprises polyurethane, polyurea, or combinations thereof.

6. The golf ball of claim 1, wherein the core has a diameter of about 1.55 inches or greater.

7. The golf ball of claim 1, wherein the cover has a thickness of about 0.025 inches to about 0.04 inches.

8. The golf ball of claim 1, wherein the layer has a thickness of about 0.01 to about 0.045 inches.

9. The golf ball of claim 1, wherein the layer has a hardness of about 50 to about 75 Shore D.

10. The golf ball of claim 1, wherein the cover has a hardness of about 35 Shore D to about 55 Shore D.

11. A golf ball comprising:
    a core;
    a layer disposed about the core having a hardness of about 30 Shore D or greater, a flexural modulus of about 1,000 psi to about 80,000 psi, and a thickness of about 0.01 inches to about 0.100 inches, wherein the intermediate layer is formed from a thermoset material; and a cover having a hardness of about 20 Shore D or greater, a flexural modulus of about 1,000 psi to about 30,000 psi, and a thickness of about 0.01 inches to about 0.05 inches, wherein the cover is firmed from a thermoplastic composition comprising p-phenylene diisocyanate and at least one hydroxy-terminated curing agent having the following structure;

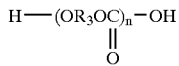

wherein $R_3$ comprises at least one phthlatate group, at least one hexamethylene group, at least one bisphenol A group, or combinations thereof, and wherein n ranges from about 1 to about 25.

12. The golf ball of claim 11, wherein the core comprises a center and an outer core layer, and wherein the center has a diameter of about 0.5 inches to about 1.3 inches.

13. The golf ball of claim 11, wherein the thermoplastic composition further comprises at least one density-adjusting filler.

14. The golf ball of claim 11, wherein the thermoset material comprises polyurethane, polyurea, or polybutadiene.

15. The golf ball of claim 11, wherein the thermoplastic composition comprises an additional curing agent.

16. The golf ball of claim 15, wherein the additional curing agent comprises hydroxy-terminated curing agents, amine-terminated curing agents, or a combination thereof.

17. The golf ball of claim 11, wherein the layer has a first hardness and the cover has a second hardness, and wherein the ratio of the second hardness to first hardness is about 1.33 or less.

18. The golf ball of claim 17, wherein the ratio of the second hardness to first hardness is about 1.14 or less.

19. The golf ball of claim 11, wherein the cover has a hardness of about 54 Shore D to 72 Shore D.

20. The golf ball of claim 11, wherein the at least one hydroxy-terminated curing agent s selected from the group consisting of poly(phthalate carbonate)glycol, poly(hexamethylene carbonate)glycol, polycarbonate polyols containing bisphenol A, and mixtures thereof.

* * * * *